(12) United States Patent
White et al.

(10) Patent No.: US 6,243,374 B1
(45) Date of Patent: *Jun. 5, 2001

(54) TELECOMMUNICATIONS CUSTOM CALLING SERVICES USING VOICE MAIL

(75) Inventors: Patrick E. White, Vienna; Robert D. Farris, Sterling, both of VA (US)

(73) Assignee: Bell Atlantic Network Services, Inc., Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/816,908

(22) Filed: Mar. 13, 1997

Related U.S. Application Data

(63) Continuation-in-part of application No. 08/752,424, filed on Nov. 19, 1996, now Pat. No. 6,014,379, which is a continuation-in-part of application No. 08/729,215, filed on Oct. 9, 1996, now Pat. No. 6,021,126, which is a continuation-in-part of application No. 08/670,908, filed on Jun. 26, 1996, now Pat. No. 6,069,890.

(51) Int. Cl.[7] .............................. H04L 12/66; H04J 3/12; H04M 3/42
(52) U.S. Cl. .......................... 370/352; 370/522; 379/201; 379/229
(58) Field of Search ..................................... 370/352, 396, 370/401, 353, 380, 392, 259, 356, 377, 410, 522, 351; 379/88.26, 88.27, 93.24, 100.08, 207, 230, 229, 201

(56) References Cited

U.S. PATENT DOCUMENTS

| | | |
|---|---|---|
| 4,191,860 | 3/1980 | Weber . |
| 4,313,035 | 1/1982 | Jordan et al. . |
| 4,371,752 | 2/1983 | Matthews et al. . |
| 4,585,906 | 4/1986 | Matthews et al. . |
| 4,602,129 | 7/1986 | Matthews et al. . |
| 4,625,081 | 11/1986 | Lotito et al. . |
| 5,012,511 | 4/1991 | Hanle et al. . |
| 5,206,901 | 4/1993 | Harlow et al. . |
| 5,243,654 | 9/1993 | Hunter . |
| 5,377,186 | 12/1994 | Wegner et al. . |
| 5,384,831 | 1/1995 | Creswell et al. . |
| 5,425,090 | 6/1995 | Orriss . |
| 5,425,091 | 6/1995 | Josephs . |
| 5,434,852 * | 7/1995 | La Porta et al. .................. 370/352 |
| 5,481,603 | 1/1996 | Gutierrez et al. . |
| 5,608,786 | 3/1997 | Gordon . |
| 5,724,355 | 3/1998 | Bruno et al. . |
| 5,726,984 | 3/1998 | Kubler et al. . |
| 5,742,675 * | 4/1998 | Kilander et al. .................. 379/265 |
| 5,812,639 * | 9/1998 | Batholomew et al. ............ 379/207 |
| 6,014,379 * | 1/2000 | White et al. ...................... 370/352 |

* cited by examiner

Primary Examiner—Chau Nguyen
Assistant Examiner—Chiho Andrew Lee
(74) Attorney, Agent, or Firm—McDermott, Will & Emery

(57) ABSTRACT

A telephone network provided with an Internet connection and a call routing and control data base connected to the Internet is further provided with multiple geographically separated voice messaging systems connected to the Internet. Calls through the telephone network may be directed to such voice messaging systems or may be forwarded to such systems. Messages may be deposited in mailboxes in such voice messaging systems and then retrieved from telephone stations located sufficiently near the voice messaging systems as to entail no long distance or time toll charges. Return call service may be provided in a manner to avoid long distance or time telephone tolls through use of the Internet connected data base which routes calls which would incur a toll charge through the Internet.

22 Claims, 16 Drawing Sheets

TELECOMMUNICATIONS CUSTOM CALLING SERVICES USING VOICE MAIL

RELATED APPLICATIONS

This application is a continuation-in-part of application Ser. No. 08/752,424, filed Nov. 19, 1996, now U.S. Pat. No. 6,014,379, titled Improved Telecommunications Custom Calling Services, which is a continuation-in-part of application Ser. No. 08/729,215, filed Oct. 9, 1996 now U.S. Pat No. 6,021,126, titled Telecommunication Number Portability, which is a continuation-in-part of application Ser. No. 08/670,908, filed Jun. 26, 1996 now U.S. Pat. No. 6,069,890, titled Internet Telephone Service, which applications are incorporated by reference herein in their entirety. The application is also related to commonly assigned application Ser. No. 08/598,767, filed Feb. 9, 1996, allowed titled Analog Terminal Internet Access, which application is incorporated by reference herein in its entirety.

TECHNICAL FIELD

This invention pertains to telecommunications networks in general and to the provision of more widely available custom calling services, such as, for example, call forwarding applications in public switched telephone networks. More particularly the invention relates to improved custom calling services in telephone networks using voice mail with Internet implementation.

Acronyms

The written description uses a large number of acronyms to refer to various services, messages and system components. Although generally known, use of several of these acronyms is not strictly standardized in the art. For purposes of this discussion, acronyms therefore will be defined as follows:

Advanced Intelligent Network (AIN)
Automated Number Identification (ANI)
Automated Teller Machine (ATM)
Called Party Number (CPN)
Carrier Portability Code (CPC)
Central Office (CO)
Common Channel Interoffice Signaling (CCIS)
Common Channel Signaling (CCS)
Customer Number Address (CNA)
Destination Point Code (DPC)
Domain Name Service (DNS)
Dual Tone Multifrequency (DTMF)
Dynamic Host Configuration Protocol (DHCP)
Generic Address Parameter (GAP)
Global Title (GTT)
Global Title Translation (GTT)
Initial Address Message (IAM)
Internet Gateway Router (IGR)
Integrated Service Control Point (ISCP)
Integrated Services Digital Network (ISDN)
Integrated Services Digital Network User Protocol (ISUP)
Intelligent Network (IN)
Interchangeable Numbering Plan Area (INPA)
International Standards Organization (ISO)
Internet Gateway Router (IGR)
Internet Routing Records (IRR)
Internet Service Provider (ISP)
Local Access and Transport Area (LATA)
Local Area Number Portability (LANP)
Local Exchange Carrier (LEC)
Location Routing Number (LRN)
Message Signaling Unit (MSU)
Multi-line Hunt Group (MLHG)
Multi-Services Platform (MSP)
Network Control Point (NCP)
Network Node Address (NNA)
Non-Geographic Number (NGN)
North American Numbering Plan (NANP)
Open Systems Interconnection (OSI)
Origination Point Code (OPC)
Person Locator Telephone Number (PLN)
Point in Call (PIC)
Point in Routing (PIR)
Point of Presence (POP)
Query on Release (QOR)
Recent Change Memory Administration Channels (RC-MAC)
Release-to-Pivot (RTP)
Service Control Point (SCP)
Service Creation Environment (SCE)
Service Switching Point (SSP)
Signal Transfer Point (STP)
Signal Control Point (SCP)
Signal Switching Point (SSP)
Signaling Point (SP)
Signaling Switching Point (SSP)
Signaling System 7 (SS7)
Signaling Transfer Point (STP)
Software Defined Network (SDN)
Simplified Message Desk Interface (SMDI)
Traffic Service Position System (TSPS)
Transaction Capabilities Applications Protocol (TCAP)
Universal Global Translation (UGT)

BACKGROUND ART

Local Exchange Carriers have for some years provided customers with a switch based call forwarding service. In recent years the availability and sophistication of this service has been expanded using the added capabilities afforded through the use of common channel interoffice signaling (CCIS) and particularly Signaling System 7 (SS7). SS7 facilitated the introduction of a variety of services referred to as custom calling services. These generally include by way of example, call forwarding, call blocking, caller ID, E911, and others. Representative samples of systems of this general type are described, by way of example, in U.S. Pat. No. 5,377,186 issued to Wegner et al. Dec. 27, 1994, U.S. Pat. No. 5,384,831 issued to Creswell et al. Jan. 24, 1995, U.S. Pat. No. 5,425,090 issued to Orriss Jun. 13, 1995, U.S. Pat. No. 4,313,035 issued to Jordan et al., U.S. Pat. No. 5,206,901 issued to Harlow, U.S. Pat. No. 5,243,645 issued to Bissell et al., and U.S. Pat. No. 5,481,603 issued to Gutierrez et al.

The Wegner et al. Patent describes a system for retrieving enhanced subscriber services from a database and for delivering those services to the subscribers of a telecommunications network without requiring the upgrading of local switches. The architecture of the system comprises a plurality of local switches that are connected to an Advanced Intelligent Network (AIN) to provide the subscribers with access to the network. The local switches utilize an ISUP call-setup-protocol that allows access to a modified SCP known as a virtual circuit service switching point to retrieve subscriber services from the data base. A virtual service switching point (ViSSP) is created by modifying only the serving SCP to include Integrated Services Digital Network User Protocol (ISUP) which provides a second route for call signaling and voice channels. The high speed operation of ViSSP is used to improve response times for activation of enhanced services while reducing the capital investment necessary in the prior art to upgrade all LSs in the network.

The Creswell et al. Patent describes a public switched telephone network adapted to provide a common platform for the provision of customer controlled features. An adjunct is operative for providing personal telecommunications services such that a subscriber may associate different call identifiers with different specifications to define respective call treatments. These features could include forwarding a telephone call associated with a call identifier to one of a number of different destinations.

Calls are treated on a per call basis and are handled in both incoming and outgoing modes dependent upon the called or calling number. While voice mail is an primary objective of the service, additional services include ring through, alternative billing and routing. For example, outgoing calls may be billed to a number other than the phone from which the call was placed. Call forwarding is available as well as enhanced services, as illustrated in FIG. 7. The system uses *codes to activate services stored in personalized files in a server at the basic adjunct.

A public switch telephone network 100 (FIG. 1) includes switching offices 110, 130 and 140 connected through central offices 10 and 20 with stations S1 through S6. Service adjunct 150 operates to process a call associated with one of the subscribers. Voice message service 200 receives voice messages from a calling party via adjunct 150 and network 100. The voice message is addressed to a party who has subscribed to the voice message service that stores messages. A subscriber can dial up service 200 via adjunct 150 and enter a PIN or password. The PIN unloads, from its internal memory, the voice message and transmits the message to the called party's station set via a network connection established between the subscriber set and service.

A subscriber may subscribe to the service and be given a unique telephone number that is permanently assigned to the subscriber as long as the subscriber subscribes to the service. The subscriber can customize calling features by dialing his/her service number to establish a network 100 connection to adjunct 150. In this manner, the subscriber can customize his/her associated record to invoke particular calling call forwarding.

The Orriss Patent describes embodiments of an AIN system in the context of an "800" service. SSP 230 (FIG. 4) triggers generation of the "800" query to the consolidated AIN/800 ISCP 310 in response to receipt of an "800" service call received from the telephone 112. Processor 312 runs the "800" service application 156 to identify the corresponding "800" service record in the "800" CMSDB 314. An "800" response, generated according to the turnaround record contained in the "800" service record, directs the AIN SSP 230 to route the call to an AIN-equipped trunk group. The AIN SSP 230 then routes the original call via a trunk group designated in the AIN response and completes the call according the AIN service instructions contained in the AIN response.

Jordan et al., U.S. Pat. No. 4,313,035 discloses a method of using an intelligent network to provide a person locator service through multiple exchanges of the switched telephone network using an AIN type of telephone system architecture. As part of this service, the system provides subscriber access to the subscriber's data in the central data base of the intelligent network, to input data for controlling the person locator service.

Each subscriber to the locator service has a unique person locator telephone number (PLN). To access the system to update data in the data base, the subscriber dials 0700 and his unique person locator telephone number. The telephone switching office routes the call to a traffic service position system (TSPS), which prompts the caller (e.g., provides an additional dial tone) and receives further digits from the subscriber. The subscriber inputs a three digit access code, indicating the type of update call, and a four digit personal identification number. If calling from the remote station to which the subscriber wishes his calls routed, the local switching office forwards the line identification number of that station to the TSPS. The TSPS forwards the dialed information and the line identification to the data base for updating the particular subscriber's location record.

An absent subscriber can input a number to which calls are to be completed, such as the number where the subscriber can be reached, into the central data base. A caller wishing to reach the subscriber dials the subscriber's unique person locator number. A telephone switching office having access to CCIS sends the dialed number to the central data base. The data base retrieves the stored completion number for the called subscriber and forwards that number back to the switching office to complete the call.

Harlow, U.S. Pat. No. 5,206,901 discloses use of an Intelligent Network to translate the directory number of an incoming call into one or more identifications of lines served by a local switching system, and one or more directory numbers not served by the local switching system. The system provides both landline telephone services and mobile telephone services.

Bissell et al., U.S. Pat. No. 5,243,645 discloses an intelligent network (IN) type system for forwarding a traveling subscriber's incoming calls to a different location identified by an automatic registration performed when the subscriber engages in a business transaction or activity that indicates his or her location. The transaction/activity can be any action that initiates updating of the electronic data base with information that directly or indirectly indicates the subscriber's identity and whereabouts. Examples include the use of a credit card at a location such as a hotel or airport, the making of a long distance telephone call with a credit card that identifies the subscriber or the use of an Automated Teller Machine (ATM).

Gutierrez et al., U.S. Pat. No. 5,481,603 discloses an intelligent network with selective routing of queries among a plurality of network control point (NCP) databases. Each end office switch has an associated global title translation (GTT) database, implemented, for example, as an element of a CNI ring interface to the SS7 (signaling system 7) signaling links. When a switch receives a call that requires intelligent call processing, such as a "software defined network" (SDN) call or an 800 call, the switch routes a query to the associated GTT database. This query fully identifies the calling station, for example by its 10 digit telephone number. The GTT database uses the calling station identification to identify the particular NCP in the telecommunications network that contains the appropriate record for completing the call. Assuming that the GTT database includes an identification of the NCP, the GTT database provides that information to the switch. The switch subsequently queries the particular NCP directly, to obtain the call processing information necessary to complete the call.

If the GTT database associated with the particular switch does not contain an appropriate entry, or an error condition exists, the GTT database so informs the switch. In response, the switch launches a further query to a centralized database, called a "universal global translation" (UGT) database. The UGT database stores appropriate GTT translations identifying the correct NCP database for each subscriber. In response to the query from the switch, the UGT database retrieves information identifying the customer ID and the particular NCP in the telecommunications network that contains the appropriate record for completing the call, and provides this information to the originating switch. The switch subsequently queries the particular NCP directly, to obtain the call processing information necessary to complete the call.

In the case where the GTT database did not include the appropriate record, the information obtained from the UGT database is also provided to and stored in the GTT database. Thus, the GTT database is "self provisioning", in that it will thereafter contain the appropriate information to avoid another query to the UGT database when the same calling station originates a subsequent call.

Other patents dealing with this general approach include Weber U.S. Pat. No. 4,191,860, issued Mar. 4, 1980, and Josephs U.S. Pat. No. 5,425,091, issued Jun. 13, 1995.

Voice mail is a service which may be considered a custom calling service and normally includes in its operation the use of call forwarding. Voice mail has become commonplace not only in business usage but also on an individual telephone service subscriber basis through Centrex service from a central office. A voice mail system is a specialized computer that stores messages in digital form on a fixed disk. The voice is generally digitized, usually at a much slower rate than the 64 Kb/s signal the central office uses in its switching network. The digitized voice is compressed and stored on a hard disk that maintains the voice mail operating system, system prompts, and greetings, and the messages themselves. A processor controls the compressing, storing, retrieving, forwarding and purging of files. A form of early systems is described in Matthews et al. U.S. Pat. No. 4,371,752 (hereinafter the Matthews '752 Patent), issued in February, 1983, and several related patents. U.S. Pat. No. 4,585,906 (hereinafter the Matthews '906 Patent), issued Apr. 29, 1986 to Gordon H. Matthews et al. The Matthews '906 Patent is a continuation-in-part of the Matthews '752 Patent. U.S. Pat. No. 4,602,129 (hereinafter the Matthews '129 Patent), issued Jul. 22, 1986 to Gordon H. Matthews et al. The Matthews '129 Patent is a continuation-in-part of the '752 Matthews Patent.

The three Matthews Patents each describe a voice mailbox type system using digital storage and programmed control to offer a wide variety of message storage, forwarding and delivery type services.

U.S. Pat. No. 4,625,081, issued Nov. 25, 1986, to Lawrence A. Lotito, et al. This patent describes an automated telephone voice service system which provides automatic recording and editing of voice messages as well as forwarding of recorded voice messages to other accounts and telephone numbers with or without operator assistance.

The Problem

In all of these prior systems the hardware and software involved are established, maintained, and controlled by the telephone companies, usually the Local Exchange Carrier (LEC). This imposes limitations on the universality of conditions under which custom services such as, by way of example, call forwarding, call blocking, voice mail and others may be offered and implemented. None of the foregoing prior art arrangements provides a system for expedient implementation of such services in a manner which lends itself to widespread adoption under varying circumstances with a minimum of alteration of telephone and other networks involved.

DISCLOSURE OF THE INVENTION

A. Objects of the Invention

It is an object of the invention to provide a system and methodology for providing efficient and economical call forwarding and voice mail services for multi-carrier telephone networks operating over large geographic regions.

It is another object of the invention to provide a system and database method of call forwarding, voice mail, and other custom services using a readily established and virtually universally accessible database or system of databases and network for accessing such databases.

It is yet another object of the invention to provide a system and database method of call forwarding, voice mail, and other custom services using a database or system of databases in the Internet.

It is yet another object of the invention to provide a system and database method of call forwarding, voice mail, and other custom services using a database or system of databases in a wide area packet internetwork to obviate and avoid the problems previously encountered in attempts to mesh the control networks or plural carriers.

It is another object of the invention to provide a system and methodology for providing both-inter carrier and inter-exchange call forwarding, voice mail, and other custom services regardless of whether one or plural carriers are involved and regardless of whether such carriers utilize CCIS or the same variety of CCIS.

It is yet another object of the invention to provide a system and database method of call forwarding, voice mail, and other custom services using a database or system of databases in the Internet in conjunction with either or both common channel signaling or in band signaling.

It is another object of the invention to provide a system and methodology for providing call forwarding, voice mail, and other custom services which is usable in combinations of networks wherein a connection with the desired party or facility does not rely solely on use of telephone networks.

It is another object of the invention to provide a system and methodology for providing call forwarding, voice mail, and other custom services which are usable to establish voice communication with users who are reachable only through non-telephone networks, such as the Internet.

It is another object of the invention to provide a system and methodology for providing multiple arrangements of voice mail service using voice messaging systems connected through the Internet.

B. Summary of the Invention

According to a preferred embodiment of the invention the dialing of a directory number which has been forwarded triggers an intelligent network (IN) signal which is directed to a gateway router to the Internet. From the Internet Gateway Router (IGR) the signal is transmitted to a database or series of databases in the Internet. This database or series of databases return call setup or routing directions which are then used by the originating network to establish a link to the station having the forwarded number. The intelligent network signal may be transmitted from a signal switching point (SSP) in the originating network to a signal transfer point (STP) and signal control point (SCP) to the Internet gateway router.

Alternatively and preferably the intelligent network signal is so coded as to proceed directly from the signal transfer point to the Internet gateway router. From the Internet gateway router the signal is directed to an Internet database where the forwarding number is obtained. This is transmitted in TCP/IP format back to the gateway router. The gateway router transmits a signal in appropriate IN format to the switching point, which then uses the forwarding number to complete the connection. In yet another situation, where a number has been forwarded to a station that is connected only to the Internet, the Internet database may provide an IP address, such as, for example, www.xxxxxxxx.tel. This address is then used to establish a link through the Internet between the originating Internet gateway router and a terminating Internet gateway router determined by the address www.xxxxxxxx.tel, and thence to the station to which the call has been forwarded. In this instance the Internet gateway routers may or may not handle both the signaling and voice connections.

The use of an Internet database or databases facilitates a greater universality and applicability of the number forwarding system and other custom services. Both common channel signaling and in band signaling may be utilized. The new arrangement facilitates the use of address systems which transcend existing telecommunications numbering systems. The Internet is virtually universally accessible and can ameliorate requirements for interfacing different types of signaling parameters which may be used by different carriers and networks.

According to another feature of the invention a telephone network provided with an Internet connection and a data base of the type described connected to the Internet is further provided with multiple geographically separated voice messaging systems connected to the Internet. Calls through the telephone network may be directed to such voice messaging systems or may be forwarded to such systems. Messages deposited in mailboxes in such voice messaging systems may then be retrieved from telephone stations located sufficiently near the voice messaging systems as to entail no long distance toll charges. Return call service may be provided in a manner to avoid long distance or time telephone tolls through use of the Internet connected data base which routes calls which would incur a toll charge through the Internet.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTION

Number Portability

Figure 1:
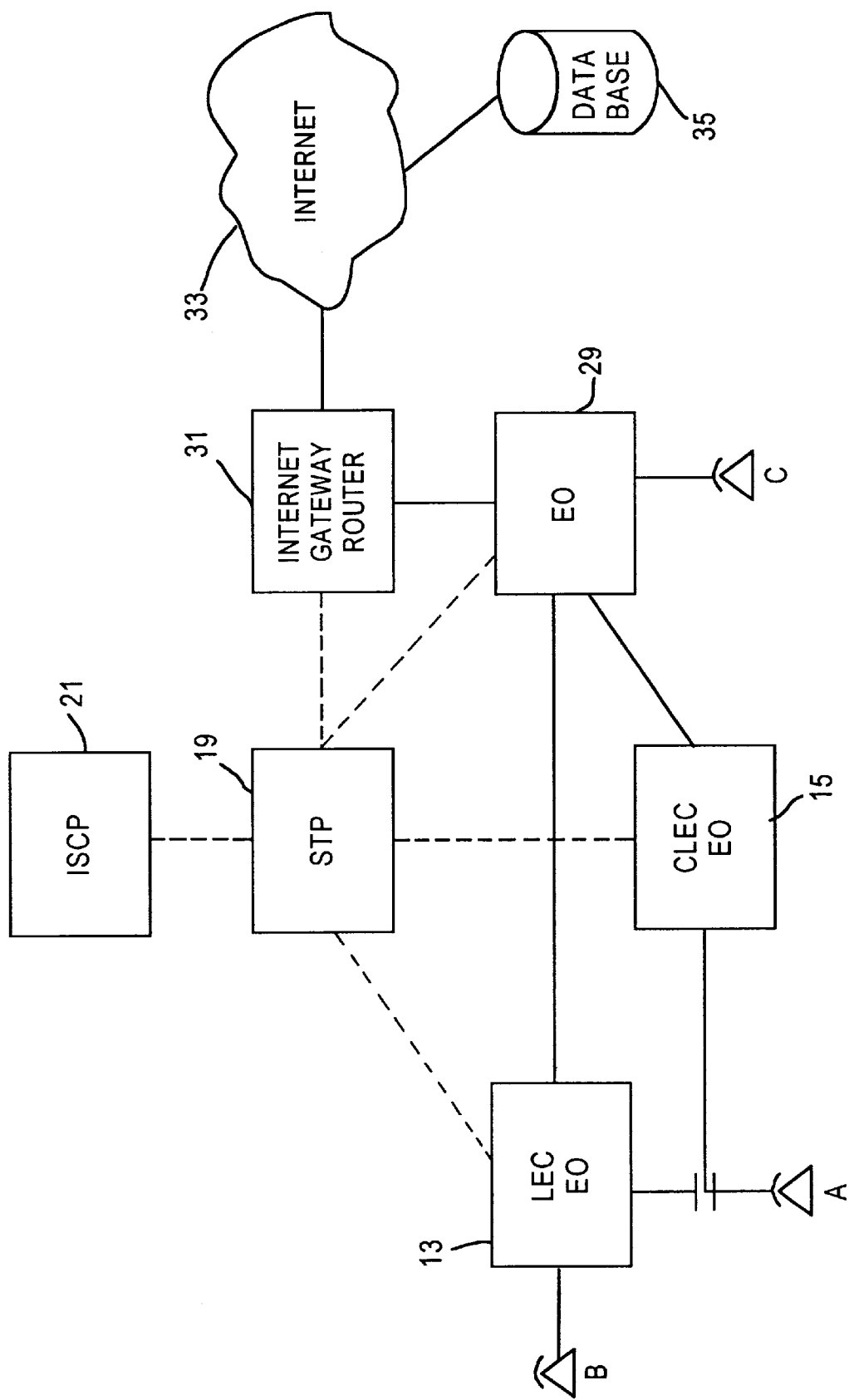
FIG. 1 is a simplified block diagram of the architecture of a network system arranged to implement one embodiment of number portability according to the invention.

Referring to FIG. 1 there is shown one preferred embodiment of the invention. According to this arrangement a telephone network is provided wherein a customer at station A may obtain local exchange telephone service from either a local exchange carrier (LEC) 13 or a competing local exchange carrier (CLEC) 15. In the illustrated example, the customer at station A originally received service through the LEC end office 13. However, the customer has now selected the competing carrier CLEC 15 for local service. Accordingly, the station A now connects to the CLEC end office 15. The CLEC end office 15 may connect through a tandem switch or trunk circuits to each LEC end office in the area of service. However, for convenience the end office 15 is shown connected to the end office 29. In this example the CLEC end office 15 is also shown as connected into the common channel interoffice signaling network via STP 19 and ISCP 21.

According to the invention the network is provided with an Internet Gateway Router (IGR) 31, which is connected to the STP 19 by a data link and to the Internet, shown as cloud 33. For purposes to be described, the Internet Gateway Router 31 is also connected by a voice link to the end office 29. Also connected to the Internet 33 is an address and telephone number database 35. The database 35 stores telephone number translations of the same general type as the ISCP database in addition to Internet addresses. The storage of addresses may be similar in nature to data stored in the Internet database described in parent application Ser. No. 08/670,908, filed Jun. 26, 1996. Thus the database 35 may be distributed and operate in a manner similar to the distributed database that is used in the Domain Name Service (DNS) servers in the Internet, as is described in further detail hereinafter. The Internet Gateway Router may also be similar in nature to that described in the parent application.

The Internet utilizes Transmission Control Protocol (TCP)/Internet Protocol (IP) or TCP/IP. A Defense Data Network (DDN) standard establishes criteria for an Internet Protocol (IP) which supports the interconnection of communication LANs.

It introduces the Internet Protocol's role and purpose, defines the services provided to users, and specifies the mechanisms needed to support those services. The standard also defines the services required of the lower protocol layer, describes the upper and lower interfaces, and outlines the execution environment services need for implementation. A Transmission Control Protocol (TCP) is a transport protocol providing connection-oriented, end-to-end reliable data transmission in packet-switched computer LANs and internetworks.

The Internet Protocol (IP) and the Transmission Control Protocol (TCP) are mandatory for use in all DoD packet switching networks which connect or have the potential for utilizing connectivity across network or subnetwork boundaries. Network elements, such as hosts, front-ends, gateways, etc., within such networks which are to be used for internetting must implement TCP/IP.

The Internet Protocol is designed to interconnect packet-switched communication LANs to form an internetwork. The IP transmits blocks of data, called Internet datagrams, from sources to destinations throughout the Internet. Sources and destinations are hosts located on either the same subnetwork or on connected LANs. The IP is intentionally limited in scope to provide the basic functions necessary to deliver a block of data. Each Internet datagram is an independent entity unrelated to any other Internet datagrams. The IP does not create connections or logical circuits and has no mechanisms to promote data reliability, flow control, sequencing, or other services commonly found in virtual circuit protocols.

The DDN standard specifies a host IP. As defined in the DoD architectural model, the Internet Protocol resides in the internetwork layer. Thus, the IP provides services to transport layer protocols and relies on the services of the lower network protocol. In each gateway, a system interconnecting two or more LANs, an IP resides above two or more LAN's protocol entities. Gateways implement IP to forward datagrams between LANs. Gateways also implement a routing protocol to coordinate signaling and other Internet control information.

Various Network Access Protocols reside below the IP and may include, by example, an Ethernet protocol or an X.25 protocol.

Figure 2:
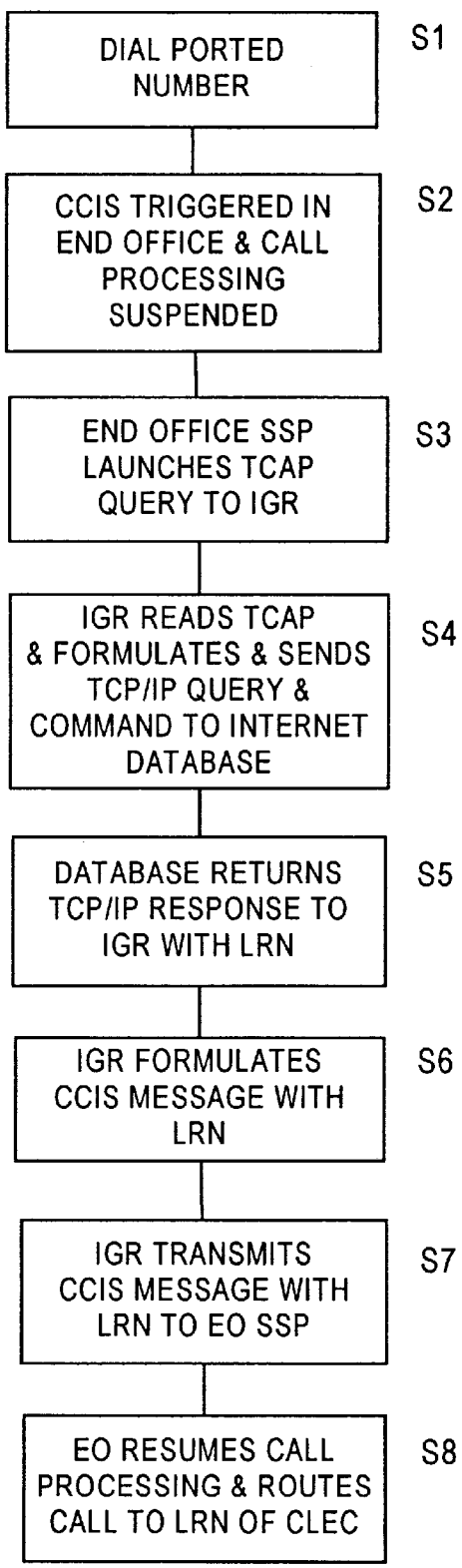
FIG. 2 is a simplified flow chart diagram of the operation of the embodiment of FIG. 1.

In completion of a call to a directory number which has been ported from the LEC to the CLEC, the system of the embodiment of the invention shown in FIG. 1 may operate in the following manner. FIG. 2 is a simplified flow chart diagram of the operation. The chart shows the exchange of signaling messages used to set up an interoffice call to a ported number using one embodiment of the invention.

Assume that the caller at station B dials the ported telephone number (703) 236-5432 at S1. In the originating end office 13, a trigger has been set against the NPA-NXX codes (236 and/or 703-236) for the LEC end office 13. Detection of the dialing of the 236 code therefore triggers common channel signaling processing by the end office 13. The end office 13 suspends call processing at S2 and launches a Transaction Capabilities Applications Protocol (TCAP) type query at S3. According to the invention the TCAP type query goes through a signaling transfer point (STP) 19 to the Internet Gateway Router 31.

The TCAP query includes a variety of data fields containing information about the call. For purposes of this discussion, the significant field in the query is the called party number field (CPN). The Internet Gateway Router thereupon performs a dip or look-up in the database 35. In the initial query to the Internet database 35, the CPN field contains the dialed number (236-5432 or 703-236-5432).

One number in the range of numbers assigned to the CLEC end office 15 is designated as a local routing number (LRN). In the example it is assumed that the LRN for the end office 15 is 703-555-9999. The Internet database will have a table translating all ported numbers into the LRN for the CLEC end office serving the telephone line of the ported number customer. In the example, the table translates 703-236-5432 into 703-555-9999. The table will include no entries for numbers still resident in the LEC end office having the called party number NPA-NXX, i.e., for numbers not ported. In the example under consideration, the called number is a ported number, and the Internet database table contains an entry.

The Internet Gateway Router translates the protocol of the received SS7 query and addresses a TCP/IP query to the database 35 at S4. This query is transmitted and seeks from the database 35 the LRN for the CLEC for the ported number. This is indicated at S4. The database performs a dip, obtains the LRN, and returns a TCP/IP response to the Internet Gateway Router 31. At S5 the Gateway Router obtains this TCP/IP response containing the requested LRN from the database. At S6 the Internet Gateway Router 31 formulates a TCAP response message including the LRN based on the TCP/IP response. In this example, the Internet Gateway Router 31 formulates a TCAP type response message with the LRN placed in the CPN field of the response. In the example, the CPN in the response is 703-555-9999, the LRN of the CLEC end office 15. The Internet Gateway Router 31 transmits the response message back through the STP 19 to the originating end office 13 in SS7 format at S7.

Upon receipt of the response message, the end office 13 resumes its processing of the call, based on the information contained in the response message. In particular, the end office 13 uses the CPN number from the response message to route the call in an otherwise normal manner. Since the dialed number was a ported number, the CPN in the response message is an LRN. In the example, the CPN in the response is 703-555-9999. The originating end office 13 utilizes the LRN to route the call to the CLEC end office 15 at S8.

Routing of the call to the CLEC end office 15 includes a transmission and reception of a number of common channel signaling messages by the originating end office 13. The first of these messages is an Initial Address Message (IAM) type message transmitted from the originating end office to the terminating end office 15. For a ported number call, the IAM message will contain the LRN (703-555-9999) in the CPN field. The IAM message also includes a generic address parameter (GAP) field. The originating end office 13 places the actual destination number (703-237-5432) in the GAP field of the IAM, for each call to a ported number as indicated by the presence of an LRN in the response from the Internet Gateway Router 31. The originating end office 13 also sets the m-bit in the forward call indicator parameter of the IAM to '1', to indicate to any subsequent switch in the call path that the number portability query has already been completed for this call.

The CLEC end office 15 will recognize the IAM message with the LRN in the CPN field as a message relating to a call to a ported number, therefore the CLEC end office 15 will utilize the number in the GAP field as the actual destination number. After the IAM message, the CLEC end office 15 will process the call in the normal manner to determine availability or busy status and ring and complete the call to the station A, if available.

If the caller calls a number that normally resides within the exchange that serves the calling party, the internal switch translations will determine how the call is routed. For example, if a caller at station B calls another number with the NPA of 236, the LEC end office 13 utilizes its internal translations. If the switch still provides telephone service for that number, the end office 13 completes the call in the normal manner. If the call is to a ported number, such as 236-5432, then the switch translation will provide the LRN (e.g., 555-9999). The end office 13 then routes the call through the CLEC end office 15 using the LRN as the CPN and using the destination number as the GAP, in the same manner as for the exemplary call from station B to station A discussed above.

Figure 3:
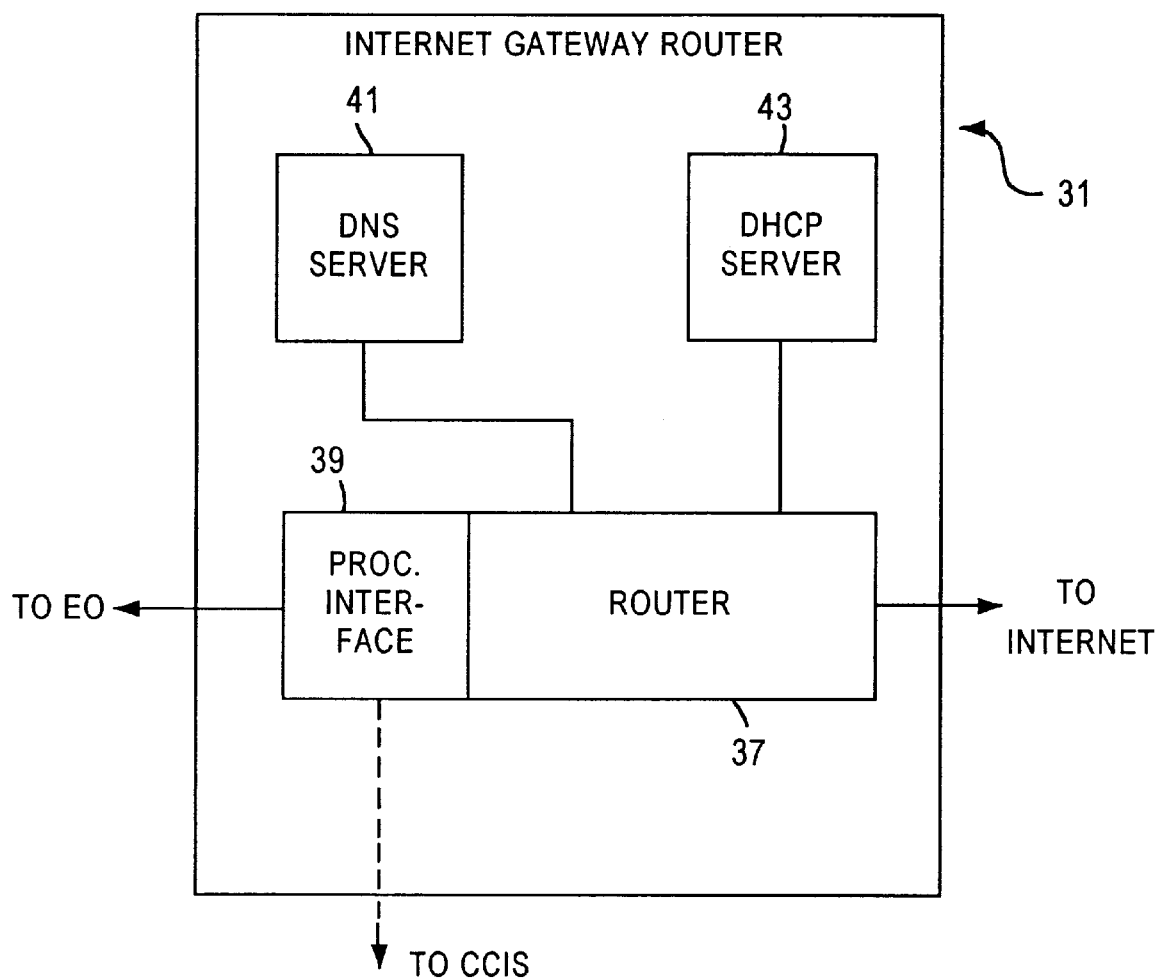
FIG. 3 is a simplified block diagram showing one form of gateway router for use with the invention.

The Internet Gateway Router 31 may be of the type shown in FIG. 3. The Internet Gateway Router, generally indicated at 31, includes a router 37 of the type now generally used in Internet practice, such as shown in FIG. 1 of parent application Ser. No. 08/670,908, which is incorporated for reference herein in its entirety. For performing some functions which may be utilized in the system the router may be provided with an interface with processing capability as illustratively shown at 39. Connected to the router are a Domain Name Service (DNS) server 41 and a Dynamic Host Configuration Protocol (DHCP) server 43 of the type conventionally used by Internet Service Providers (ISPs) in existing Internet Service. The router interface is connected to the central office and to the CCIS network while the router is connected to the Internet.

It will be appreciated by those skilled in the art that the DNS is a distributed database that holds the domain names and IP addresses of all the registered systems on the Internet. With Internet servers located all over the world, DNS translates the names to addresses and back. Individual DNS servers contain only a limited amount of information, because they know where to find details on domains they have yet to encounter. If an individual server does not contain information for a specific domain name, it passes the request along the hierarchy of servers until the information is found. In practice this means that the request can be handled by any number of servers in the constantly changing Internet. The server that originally made the request will cache the information to satisfy future requests without the need to go to an authoritative server, i.e., a server which has the desired information. It will also be understood that if the IP address is initially stated in its ultimate number form, the DNS translation is unnecessary.

It is an advantage of the invention that number portability may be provided with respect to numbers assigned to stations which can be reached only through the Internet. Among other advantages, this feature provides operability over greatly expanded geographic areas which may be international. The use of the hierarchical DNS techniques for the DNS and for the database 31 permits virtually unlimited expansion possibilities.

Figure 4:
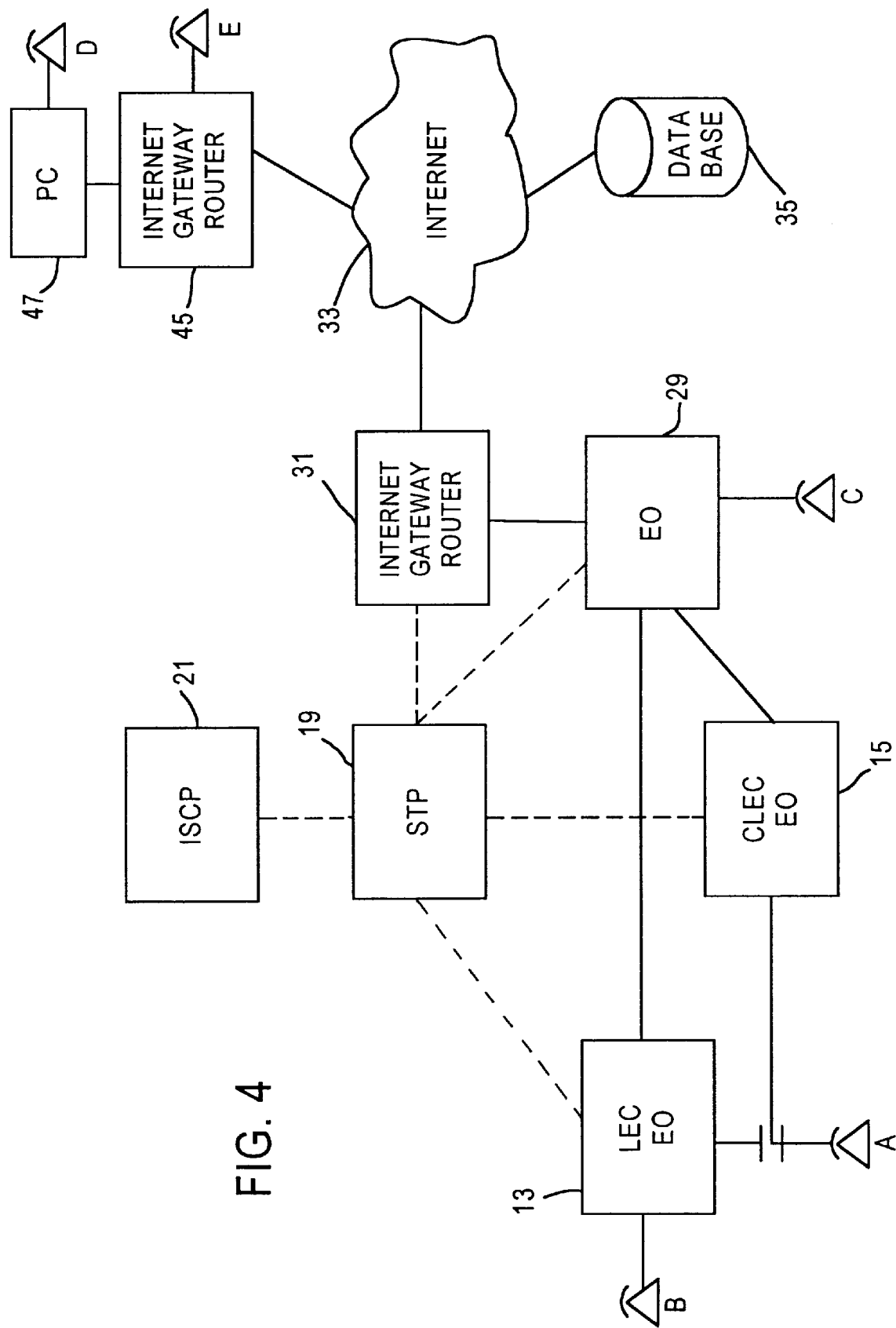
FIG. 4 is an illustration of a network similar to that in FIG. 1 showing an embodiment of the invention which implements number portability in a situation where the station to which the ported number is assigned may be reached only through the non-telephone company network.

According to a first embodiment of this feature of the invention there is shown in FIG. 4 a network similar to that illustrated in FIG. 1 wherein like reference numerals are used. In this arrangement a second Internet Gateway Router 45 is connected to the Internet and to a station D which is connected directly to the Internet Gateway Router 45 through a processor such as a PC 47. Station D may be reached only through the Internet. The station D may be a plain old telephone station (POTS) or may constitute a computer microphone and speaker or headset arrangement, such as the type described in the parent application. In this embodiment it is assumed that the subscriber customer formerly had subscribed to telephone service from an LEC and had a conventional DNA-NXX-XXXX telephone number assigned. By way of example, it is assumed that the former subscriber has moved and presently desires an Internet only telephone connection to which his/her DNA-NXX-XXXX number will be ported.

Figure 5:
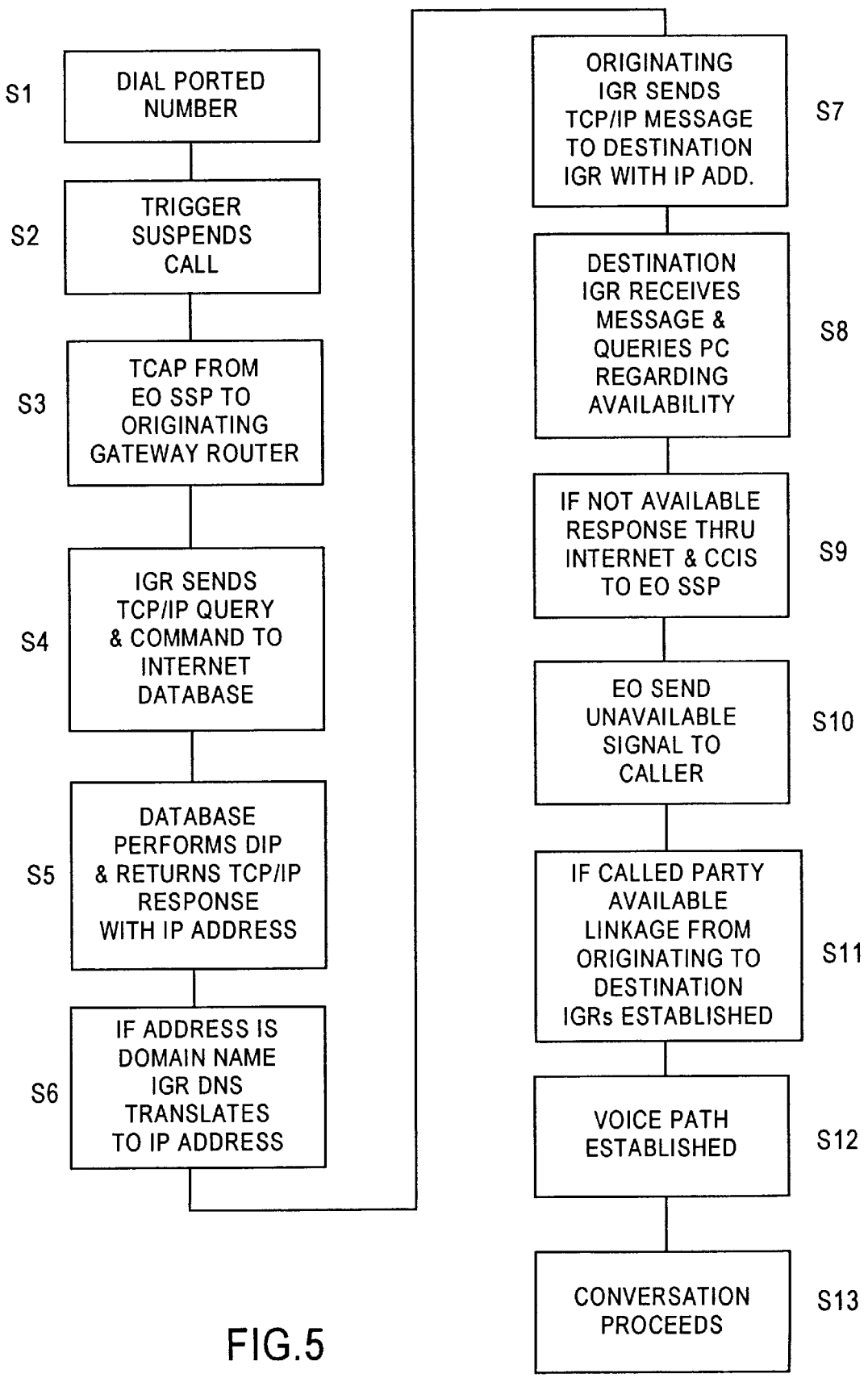
FIG. 5 is a simplified flow chart of the operation of the system illustrated in FIG. 4.

According to this embodiment of the invention the subscriber is possessed of a domain name Internet address and maintains his/her processor or PC in a continuously energized condition. In this embodiment of the invention the Internet database 35 is provided with a translation table or tables which not only provide translations from telephone number to telephone number but also provide translations from ported telephone number to Internet addresses. In this instance the translation table for the ported number for the station D provides an Internet address for the processor or PC 47. A simplified flow chart of the operation is presented in FIG. 5. Such operation proceeds in the following manner.

At S1 a caller dials the ported number DNA-NXX-XXXX of the subscriber at station D. This triggers the suspension of the call at S2. At S3 the originating end office switching system and associated SSP transmit a query TCAP message to the Internet Gateway Router 31. This message includes the ported number that was dialed. At S4 the Internet Gateway Router formulates and transmits a TCP/IP query or command through the Internet to the database 35, seeking retrieval of the present number of the subscriber. The database performs a data dip, i.e., searches its tables, and dispatches a response to the inquiring Internet Gateway Router 31. This response forwards the Internet address corresponding to the ported number. This is shown at 5. If the address returned by the database is in the form of a domain name, the Internet Gateway Router performs a translation to the Internet address at S6.

At S7 the originating Internet Gateway Router 31 formulates or assembles a TCP/IP packet (or packets) message and transmits the message through the Internet to the destination Internet Gateway Router 45. This message includes the address of the destination Internet Gateway Router 45, the originating Internet Gateway Router 31, and the Internet address of the subscriber at station D. The destination Internet Gateway Router 45 receives the message at S8 and queries the processor or PC 47 to determine if the called party is available. If the party is not available, signaling messages to that effect are returned through the Internet and common channel signaling network to the calling end office SSP in inverse fashion at S9. The calling end office thereupon returns a busy or not available prompt to the caller at S10. If the called party is available a TCP/IP linkage from originating Internet Gateway Router 31 to destination Internet Gateway Router 45 is established at Sl. The Internet Gateway Routers at the originating and terminating ends perform the translation from voice to TCP/IP packets to voice signals and a voice path is established through end office 29 and originating end office 13 at S12. The conversation thereupon proceeds at S13.

While the embodiment of the invention shown in FIG. 4 utilized a processor or PC 47 at the premises of the subscriber, it is also a feature of the invention that the processing which occurs at that site may alternatively be performed at the site of the Internet Gateway Router and a voice message delivered to the telephone station D. Such an embodiment is illustrated in FIG. 4 by station E connected directly to Internet Gateway Router 45. The destination Internet Gateway Router 45 performs the processing previously performed in processor or PC 47 in FIG. 4.

Call Forwarding

Figure 6:
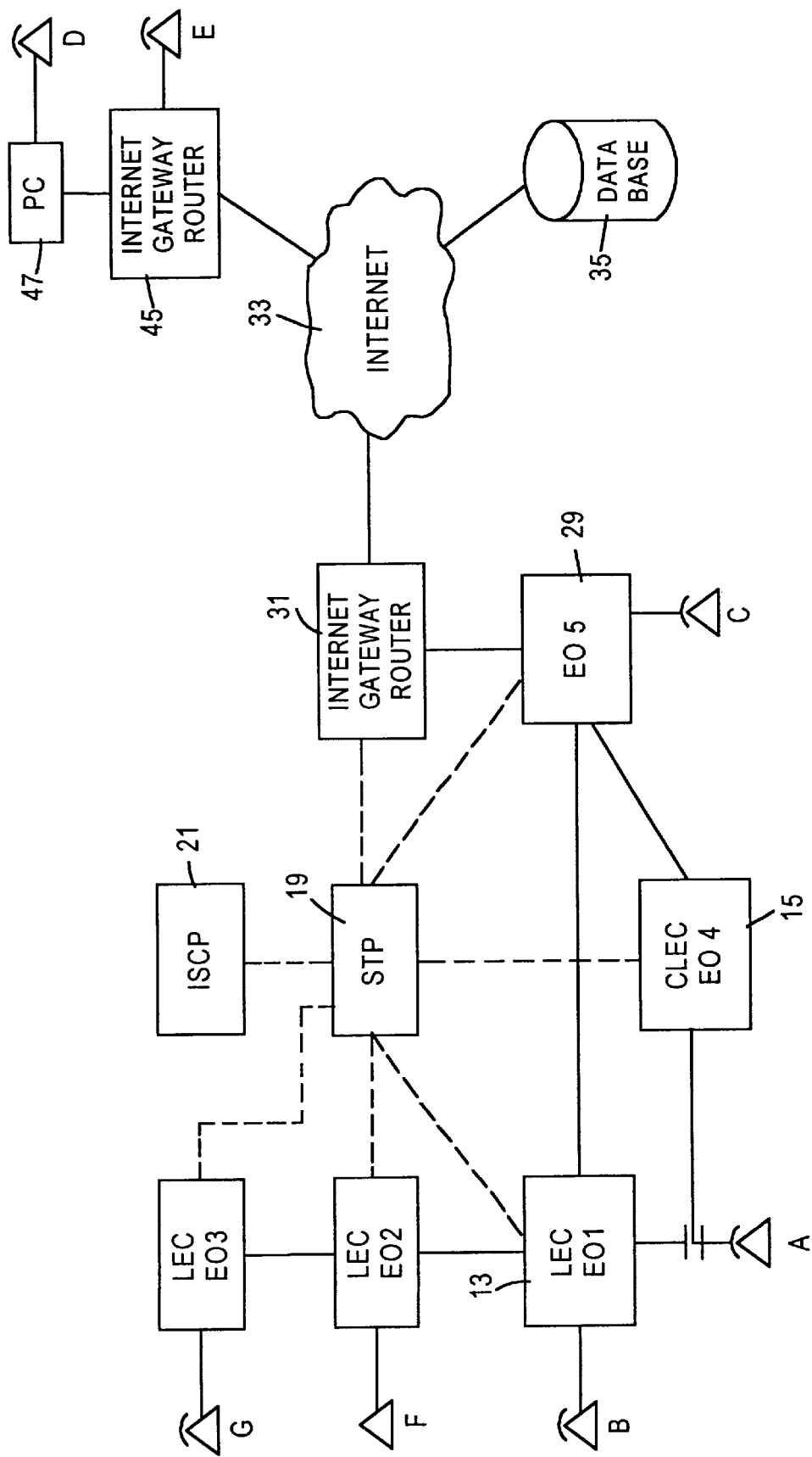
FIG. 6 is an illustration of a network similar to that in FIG. 1 showing an embodiment of the invention which implements call forwarding.

Referring to FIG. 6 there is shown another preferred embodiment of the invention. In FIG. 6 there is shown a network similar to that in FIG. 4 wherein the LEC is shown with a plurality of end offices EO1, shown at 13 as in FIG. 4, EO2, and EO3. The offices are shown connected be connected via one or more tandems (not shown). The LEC end offices are connected to the STP 19 by data links shown as broken lines. Each end office serves a plurality of customer premises stations which are here shown illustratively as the telephone stations B, F, and G. The CLEC likewise comprises multiple end offices EO4 and EO5, which are trunked together and serve customer premises stations here illustrated as telephone stations A and C. The STP 19 is connected to the Internet Gateway Router (IGR) 31 and thence to the Internet 33 as previously explained. Also as previously described the Internet is connected to the data base 35 and to the Internet Gateway Router 45 which serves the customer PC 47 and the customer premises telephone stations D and E.

According to this embodiment of the invention the database 35 not only provides translations from telephone number to telephone number and Internet addresses but also stores Internet Routing Records (IRR) for all served entities. Among other purposes this storage serves as a repository of call processing records for custom calling services provided to served entities. This includes the services provided to the stations A G in FIG. 6. Services which may be created and maintained using the IRR include call forwarding, call blocking, call screening, automatic call distribution and like services. According to this embodiment of the invention such services are not constrained to telephone stations served by LECs but may also be provided to non-telephone company connected stations, such as, by way of example, the stations D and E. It will be apparent that the volume of data stored in the database 35 will be large and will grow larger as use of the Internet increases. For this reason the database 35 is preferably a distributed hierarchical database as previously described.

Figure 7:
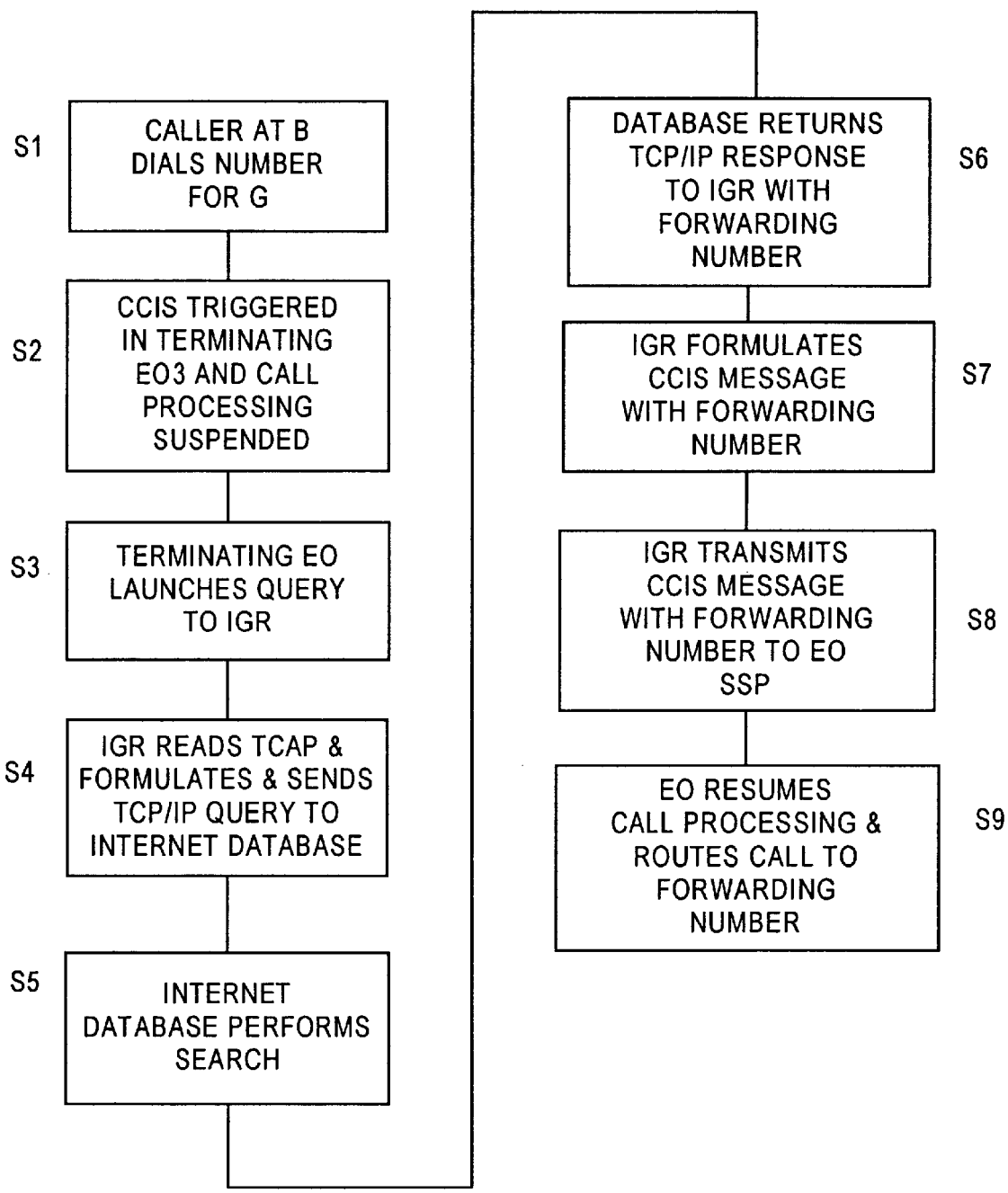
FIG. 7 is a simplified flow chart of one mode of the operation of the system illustrated in FIG. 6.

The operation of the network of FIG. 6 for a call forwarding application is now described in conjunction with the simplified flow chart in FIG. 7. In the embodiment previously discussed with reference to FIGS. 1 and 2 the trigger was set in the originating switch or associated SSP, i.e., an originating trigger was used. In the embodiment now discussed the trigger which is used is a terminating trigger set in the terminating switch or associated SSP. In each situation the SSP is set up to recognize the dialed number or code for the dialed number as requiring ISUP (Integrated Services Digital Network User Part) call setup. Upon such recognition the switch or SSP sends a query message via the STP to the ISCP when the CCIS is operating in a conventional AIN environment. The operation of such an AIN environment is described in detail in "Bellcore AIN Switching Systems Generic Requirements" GR-1298-CORE, Issue 2, December 1994, which is hereby incorporated by reference.

Referring to FIG. 7, at S1 a caller at telephone station B in FIG. 6 dials the directory number for telephone station G. The subscriber at station G has call forwarding service and has directed that all calls to station G be forwarded to station F. In the terminating end office EO3, a trigger has been set against the NPA-NXX-XXXX code for the subscriber at G. Detection of the dialing of this code at EO3 upon receipt of the IAM CCIS signal indicates that the subscriber to the called number is a subscriber to custom calling services. As a result intelligent common channel signaling processing by the end office EO3 (which is SSP equipped) is triggered.

The end office EO3 suspends call processing at S2 and launches a Transaction Capabilities Applications Protocol (TCAP) type query at S3. The TCAP type query goes through the signaling transfer point (STP) 19 to the Internet Gateway Router (IGR) 31. The Internet Gateway Router translates the protocol of the received SS7 query and sends a TCP/IP query to the database 35 at S4. According to the invention the Internet Routing Record for the custom calling of the subscriber at G has been stored in the IRR database 35. The TCAP query to the IGR 31 includes a variety of data fields containing information about the call. The significant field in the query in this example is the called party number field (CPN). The Internet Gateway Router thereupon so formulates the TCP/IP message as to have the database 35 perform a search or look-up at S5.

The database performs the search, obtains the number to which the call should be forwarded, and returns a TCP/IP response to the Internet Gateway Router 31. At S6 the Gateway Router obtains this TCP/IP response containing the number to which the call should be directed. At S7 the Internet Gateway Router 31 formulates a TCAP response message including this number based on the TCP/IP response. In this example, the Internet Gateway Router 31 formulates a TCAP type response message with the new number placed in the CPN field of the response. The Internet Gateway Router 31 transmits the response message back in SS7 format through the STP 19 to the end office EO3 at S8.

Upon receipt of the response message, call processing is resumed based on the information contained in the response message. In particular, the CPN number from the response message is used to route the call in an otherwise normal manner. Since the dialed number was a forwarded number, the CPN in the response message indicates this number, and that number is used to route the call to the end office EO3 at S9.

In the preceding example the called number and the number to which the subscriber had directed the call to be forwarded were served by the same LEC. It is also a feature of the invention that call forwarding and other custom calling services may be provided in an intercarrier fashion. In the call forwarding example a subscriber may direct call forwarding to a number served by a different LEC or by a CLEC. An example of such operation of the invention is indicated in the simplified flow chart in FIG. 8. In this example the CLEC telephone subscriber at station A has directed forwarding of calls dialed to station A, which was formerly served by the LEC from end office EO1, to station B which is served by the LEC from EO1. In this situation the storage maintained in the Internet Routing Record (IRR) database 35 by the CLEC contains a service profile for subscriber A which directs forwarding calls to the NPA-NXX-XXXX of station A to the NPA-NXX-XXXX of station B.

Figure 8:
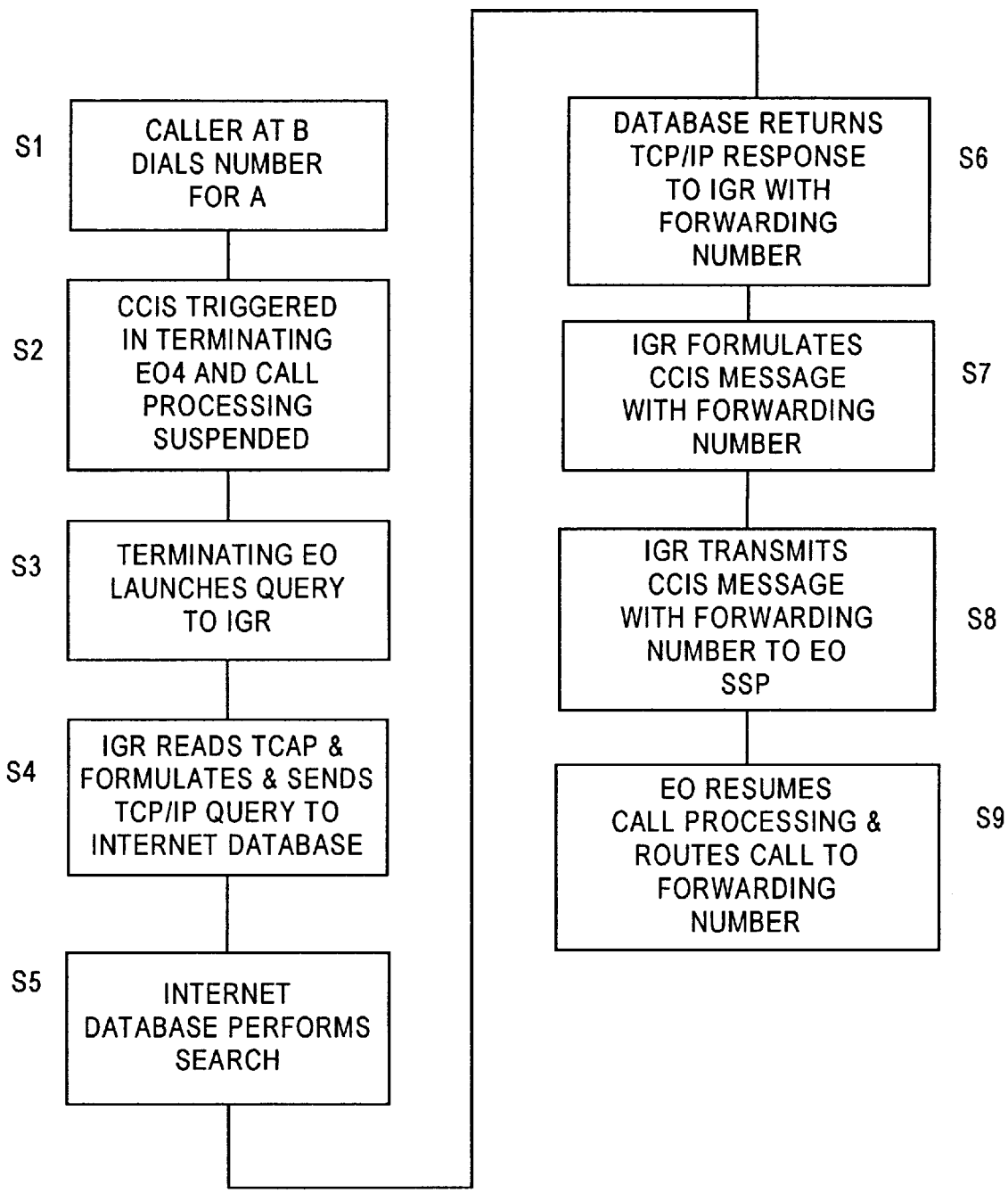
FIG. 8 is a simplified flow chart of another mode of the operation of the system illustrated in FIG. 6.

Referring to FIG. 8, at S1 a caller at telephone station G in FIG. 6 dials telephone station A at S1. In the terminating CLEC end office EO4, a trigger has been set against the NPA-NXX-XXXX code for the called subscriber at A, which is served by the destination EO4 of the CLEC. Detection of the dialing of this code upon receipt of the IAM CCIS signal indicates that the subscriber to the called number is a subscriber to custom calling services and therefore triggers intelligent common channel signaling processing by the end office EO4. The end office EO4 suspends call processing at S2 and launches a Transaction Capabilities Applications Protocol (TCAP) type query at S3. The TCAP type query goes through the signaling transfer point (STP) 19 to the Internet Gateway Router 31.

The Internet Gateway Router 31 translates the protocol of the received SS7 query and addresses a TCP/IP query to the database 35 at S4. According to the invention the Internet Routing Record for the custom calling of subscriber at A has been stored in the IRR database 35. The TCAP query to the IGR 31 includes the previously discussed variety of data fields containing information about the call. The significant field in this query is the called party number field (CPN). The Internet Gateway Router thereupon so formulates the TCP/IP message as to have the database 35 perform a search or look-up at S5.

The database performs the search, obtains the number to which the call should be forwarded, and returns a TCP/IP response to the Internet Gateway Router 31 at S6. The Gateway Router 31 obtains this TCP/IP response containing the number to which the call should be directed, namely the number for station B, and at S7 formulates a TCAP response message including this number based on the TCP/IP response. In this example, the Internet Gateway Router 31 formulates a TCAP type response message with the station B number placed in the CPN field of the response. The Internet Gateway Router 31 transmits the response message back through the STP 19 to the triggering end office EO4 in SS7 format. This is indicated at S8.

Upon receipt of the response message, the end office EO4 resumes its processing of the call, based on the information contained in the response message. In particular, the end office uses the CPN number from the response message to route the call in an otherwise normal manner. Since the dialed number was a forwarded number, the CPN in the response message indicates this number. The end office utilizes that number to route the call to the end office EO0 at S9.

It is an advantage of the invention that call forwarding and other custom calling services may be provided with respect to numbers assigned to stations which can be reached only through the Internet. Among other advantages, this feature provides operability over greatly expanded geographic areas which may be international. The use of the hierarchical DNS techniques for the DNS and for the database 31 in FIG. 3 permits virtually unlimited expansion possibilities.

According to a first embodiment of this feature of the invention there is shown in FIG. 6 a second Internet Gateway Router (IGR) 45 which is connected to the Internet. The Internet Gateway Router 45 is also connected to a station D through a processor such as a PC 47. Station D may be reached only through the Internet. The station D may be a plain old telephone station (POTS) or may constitute a computer microphone and speaker or headset arrangement, such as the type described in the parent application. In this embodiment the subscriber at D has only an Internet IP address and maintains his/her processor or PC in a continuously energized condition. The Internet Routing Record (IRR) database 35 is provided with a translation table or tables which not only provide translations from telephone number to telephone number but also provide translations from telephone numbers to Internet addresses. In this instance the translation table for the forwarded number for the station B provides an Internet address for the processor or PC 47. A simplified flow chart of the operation is presented in FIG. 9. Such operation proceeds in the following manner.

At S1 a caller at station G connected to end office EO3 dials the forwarded number DNA-NXX-XXXX of the subscriber at station B. The IAM from the calling end office EO3 to the end office EO1 for station B triggers the suspension of the call at S2. At S3 the triggered end office switching system and associated SSP transmit a query TCAP message to the Internet Gateway Router 31. This message includes the forwarded number that was dialed.

At S4 the Internet Gateway Router 31 formulates and transmits a TCP/IP query or command through the Internet to the database 35, seeking retrieval of the forwarded number of the subscriber. The database performs a data search, and dispatches a response to the inquiring Internet Gateway Router 31. This response forwards the Internet address corresponding to the forwarded number. This is shown at S5. If the address returned by the database is in the form of a domain name, the Internet Gateway Router 31 performs a translation to the Internet address at S6.

At S7 the originating Internet Gateway Router 31 formulates or assembles a TCP/IP packet (or packets) message and transmits the message through the Internet to the destination Internet Gateway Router 45. This message includes the address of the destination Internet Gateway Router 45, the originating Internet Gateway Router 31, and the Internet address of the subscriber at station D.

The destination Internet Gateway Router 45 receives the message at S8 and queries the processor or PC 47 to determine if the called party is available. If the party is not available, signaling messages to that effect are returned through the Internet and common channel signaling network to the calling end office SSP in inverse fashion at S9. The calling end office thereupon returns a busy or not available prompt to the caller at S10.

If the called party is available a TCP/IP linkage from originating Internet Gateway Router 31 to destination Internet Gateway Router 45 is established at S11. The Internet Gateway Routers at the originating and terminating ends perform the translation from voice to TCP/IP packets to voice signals and a voice path is established from the originating end office EO3 through the Internet Gateway Router (IGR) 31, the Internet 33, and Internet Gateway Router (IGR) 45 at S12. The conversation thereupon proceeds at S13.

Figure 9:
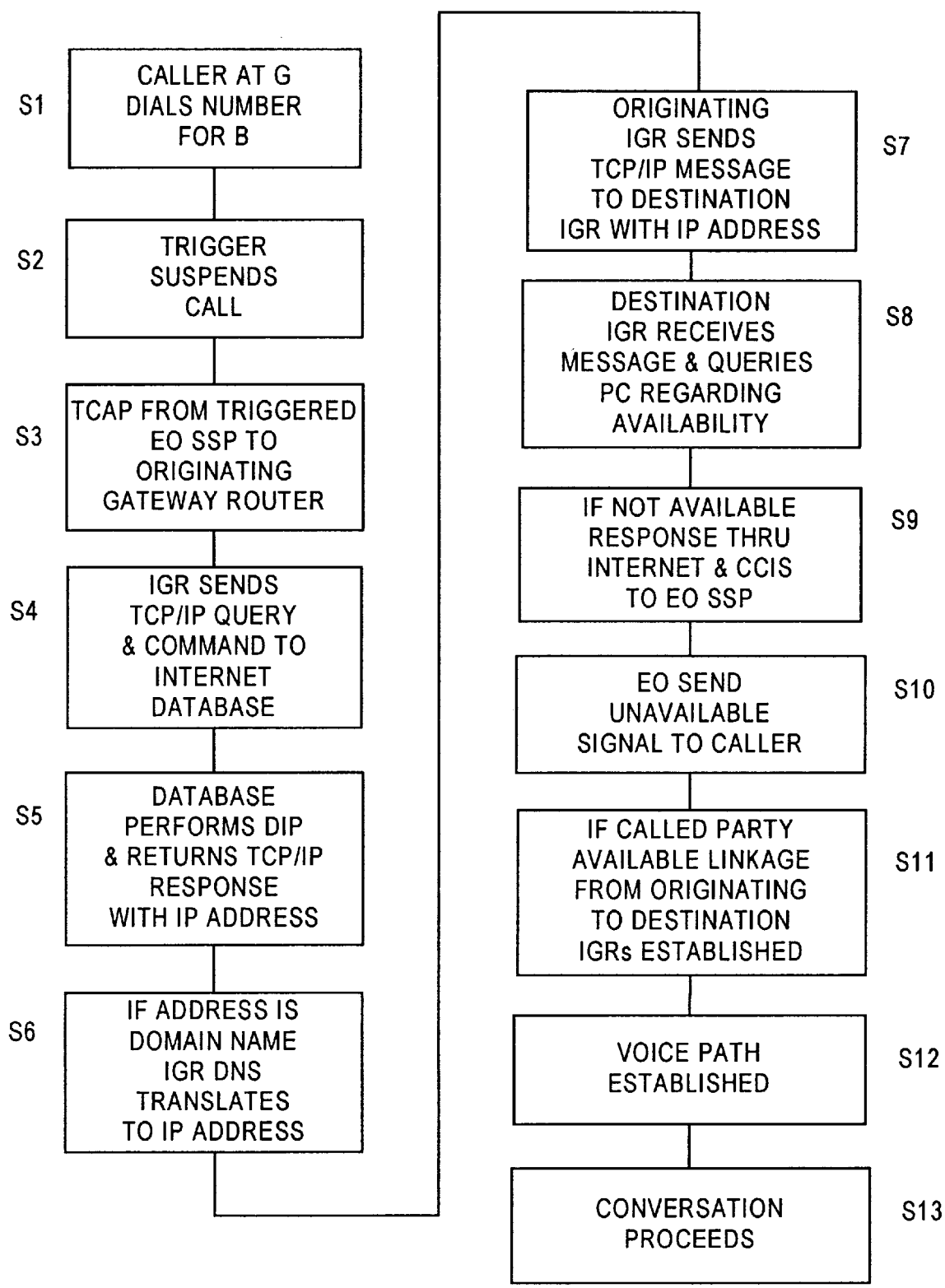
FIG. 9 is a simplified flow chart of yet another mode of the operation of the system illustrated in FIG. 6.

While the embodiment of the invention shown in FIGS. 8 and 9 utilized a processor or PC 47 at the premises of the subscriber, it is also a feature of the invention that the processing which occurs at that site may alternatively be performed at the site of the Internet Gateway Router and a voice message delivered to the telephone station D. Such an embodiment is illustrated in FIG. 8 by station E connected directly to Internet Gateway Router 45. The destination Internet Gateway Router 45 performs the processing previously performed in processor or PC 47.

Voice Mail

Figure 10:
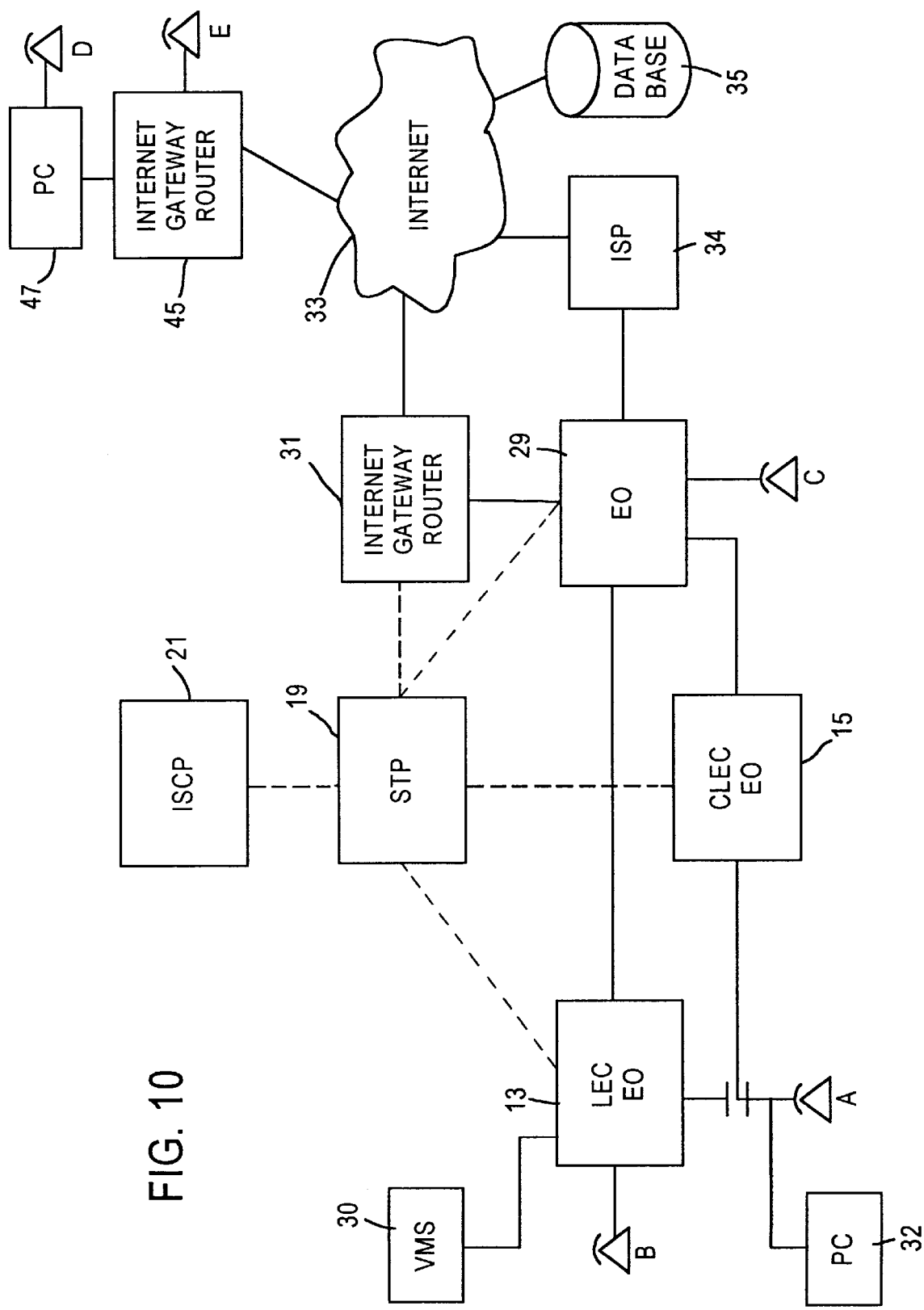
FIG. 10 is an illustration of a network similar that in FIG. 4 showing an embodiment of the invention for implementing call forwarding services.

Referring to FIG. 10 there is shown network architecture for implementing another preferred embodiment of the invention particularly adapted to providing various services utilizing improved voice mail techniques. The network in FIG. 10 is generally similar to that shown in FIG. 4 and similar reference numerals are used to identify similar elements. In this network a customer at station A may obtain local exchange telephone service from either a local exchange carrier (LEC) 13 or a competing local exchange carrier (CLEC) 15. In the illustrated example, the customer at station A originally received service through the LEC end office 13. However, the customer has now selected the competing carrier CLEC 15 for local service. Accordingly, the station A now connects to the CLEC end office 15. The CLEC end office 15 may connect through a tandem switch or trunk circuits to each LEC end office in the area of service. However, for convenience the end office 15 is shown connected to the end office 29. In this example the CLEC end office 15 is also shown as connected into the common channel interoffice signaling network via STP 19 and ISCP 21.

The network is provided with an Internet Gateway Router (IGR) 31, which is connected to the STP 19 by a data link and to the Internet, shown as cloud 33. The Internet Gateway Router 31 is also connected by a voice link to the end office 29. Also connected to the Internet 33 is an address, telephone number, and Internet Routing Record database 35. The database 35 stores information of the same general type as the ISCP database including Call Processing Record (CPR) or customer profile type information in addition to Internet addresses and other data. The storage of addresses may be similar in nature to data stored in the Internet database described in parent application Ser. No. 08/670,908, filed Jun. 26, 1996. Thus the database 35 may be distributed and operate in a manner similar to the distributed database that is used in the Domain Name Service (DNS) servers in the Internet, as previously described.

The LEC depicted in FIG. 10 provides voice mail services and to that end has a Voice Mail Service or Voice Messaging System (VMS) platform 30 connected to end office (EO) 13 by way of illustration. The VMS may be of the type described in the above identified related application Ser. No. 08/598,676. The CLEC in FIG. 10 does not provide a voice mail platform. The premises where telephone station A is located also has a PC 32 connected to the local link which may be used for conventional purposes as well as an additional purpose to be described.

According to the invention the CLEC may use the capabilities made possible by the network shown in FIG. 10 to provide voice mail services to its customers or subscribers without installing its own voice mail platform. By arrangement with the LEC, which provides voice mail services through its VMS platform 30, the CLEC maintains call processing records for its subscribers. Such records would include routing and call handling instructions to implement voice mail service. Thus, in an illustrative example the CLEC subscriber at A has arranged with the CLEC a subscription for conventional voice mail services. This fact is reflected in the subscriber profile or CPR stored in the Internet database 35 for this customer. An appropriate trigger has been set in the end office EO 15 serving this subscriber. The operation of this arrangement in the network is now described in relation to the flow diagram shown in FIG.

Figure 11:
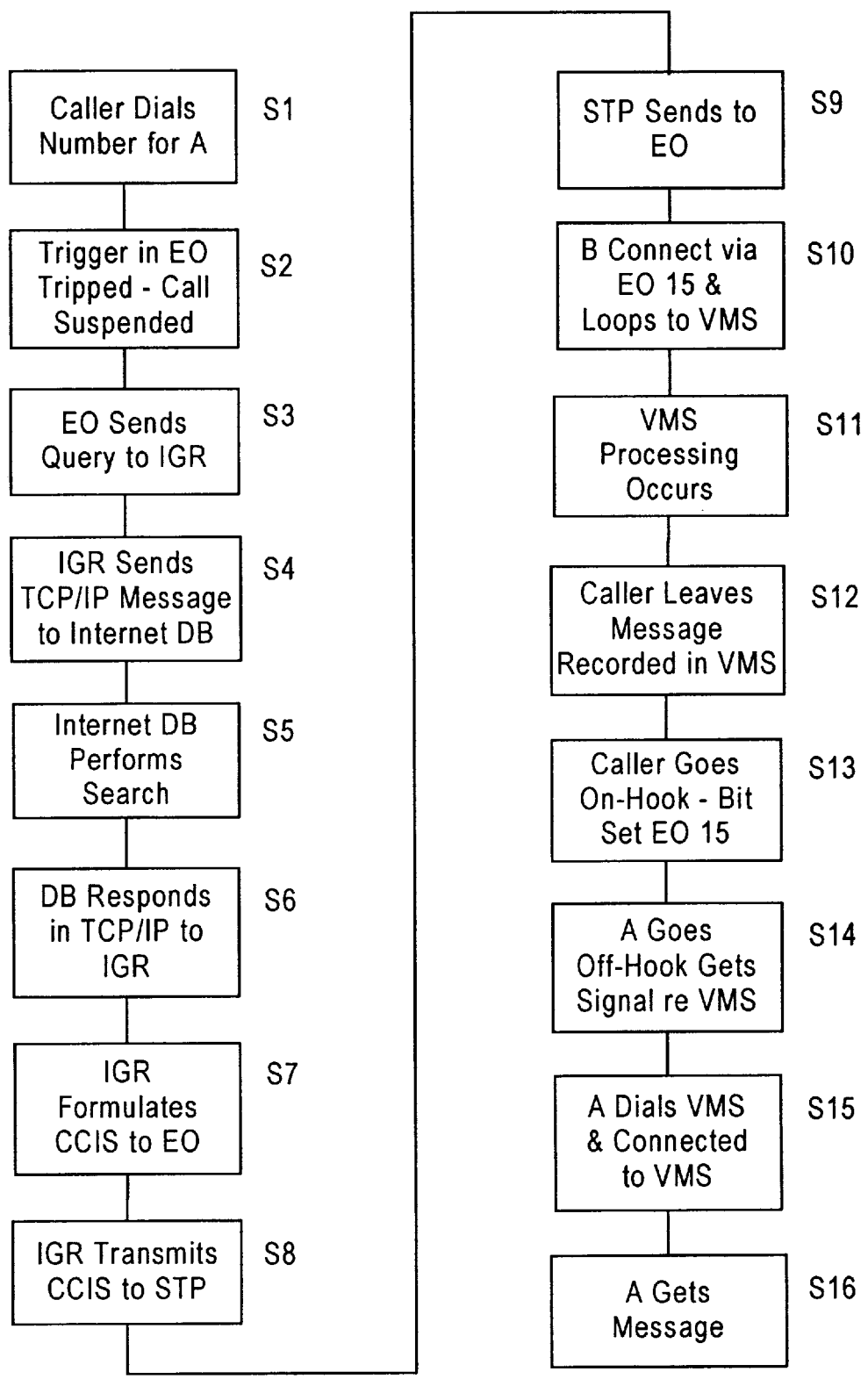
FIG. 11 is a simplified flow chart illustrating one mode of operation of the system illustrated in FIG. 10.

Referring to FIG. 11, a caller at telephone station B dials the number for telephone station A. This is shown at S1. It is assumed that the telephone at station A is busy or does not answer. Station A has subscribed to voice mail services and its end office switch EO 15 has an appropriate trigger set. This activates the trigger set in end office EO 15 whereby call processing is suspended. This is shown at S2. The SSP at end office EO 15 launches a CCIS or SS7 query via signal transfer point STP 19 to Internet Gateway Router (IGR) 31 at S3. At S4 the Internet Gateway Router IGR 31 reads the CCIS or SS7 message and sends a TCP/IP query message to the Internet Database 35.

The Internet Database performs a search at S5. As a result of the search the Internet data base ascertains at S5 that subscriber A has voice mail service and that this voice mail is to be implemented by the voice messaging system VMS 30. At S6 the Internet database 35 returns a TCP/IP response to the Internet Gateway Router (IGR) 31. This response includes the voice mail forwarding number to the voice messaging system VMS 30 which is connected to the LEC end office EO 13. The IGR 31 formulates a CCIS or SS7 message including this forwarding number and directions to route through the subscribing end office EO 15. This is shown at S7. At S8 the IGR 31 transmits a CCIS or SS7 message with the forwarding number and routing instructions to the STP 19. The STP 19 sends the message to the subscribing end office EO 15 at S9. Pursuant to the routing instructions the caller is connected to the called end office EO 15 and from there is connected back to the voice messaging system VMS 30 through the intervening offices EO 29 and 13 at S10. The caller is now connected to the voice messaging platform VMS 30. Conventional voice mail processing then occurs at S11.

Such processing entails the VMS delivering through this connection a voice prompt or message to the caller at B, reporting that the line is busy or does not answer and inviting the caller to leave a message. This is shown at S11. At S12 the caller leaves a message and this is recorded in digital form in the voice messaging system VMS 30. When the caller at B goes on-hook a voice mail present bit is set in the subscribing switch at end office EO 15. This is shown at S13. When the subscriber at A next goes off-hook at S14 this bit results in a signal to the caller that he has voice mail. The caller may then dial the pre-determined digits, whereupon a connection is made from telephone station at A to the VMS 30 at S15. The subscriber may then access the recorded voice message in the conventional fashion at S16.

According to another feature of the invention the subscriber may be provided with a wide capability for controlling his CPR or service profile. Referring to FIG. 10 the subscriber at telephone station A connected to the CLEC end office EO 15 has a PC 32 connected to the local link. With the use of this PC it is possible for the subscriber to set up an Internet session either through the Internet Gateway Router (IGR) 31 or through any commercial Internet Service Provider (ISP), such as the ISP shown illustratively at 34 in FIG. 10. In this illustration the PC 32 is provided with an internal modem although an external modem may obviously be used.

Through conventional Internet procedures the subscriber may establish a connection to Internet data base 35. According to this aspect of the invention the section of storage maintained by the CLEC may be set up so as to be edited through such a connection. It will be understood that such access may be had only after the connecting party had satisfied suitable security barriers established to prevent unauthorized access. With such an arrangement the subscriber may at any time and from any site from which he may access the Internet, change or customize the conditions under which calls to the number for telephone station A is connected to station A or forwarded. For example, the forwarding of calls to voice mail could be subject to time of day, call screening, call blocking, and other particularized restrictions established according to the personal preferences of the subscriber.

Figure 12:
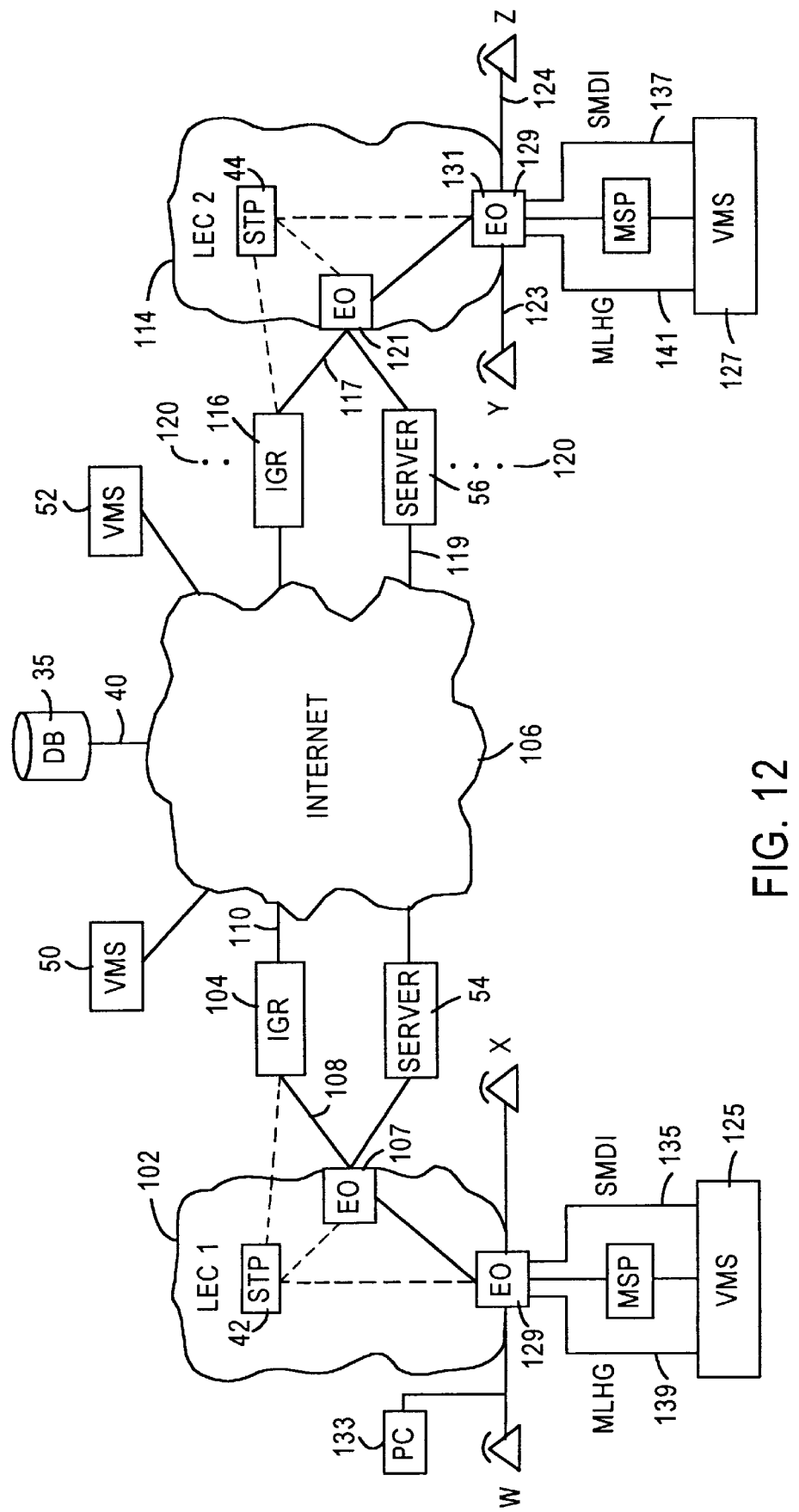
FIG. 12 is an illustration of another network architecture according to the invention for implementing varied voice messaging services pursuant to other embodiments of the invention.

Referring to FIG. 12 there is shown a diagram of the architecture of yet another embodiment of the invention. The network in FIG. 12 is shown as including two LECs 102 and 114. Voice messaging systems VMS 125 and 127 are respectively associated with each of the LECs 102 and 114 through their end office EO switching systems 129 and 131. Each switching system 129 and 131 in this illustration comprises an end office EO which is connected to customer premises equipment, illustrated as telephone stations W, X, Y, and Z. Local telephone lines or local loops serve as local communication links between each of the telephone stations and its end office switching system. It will be understood that the subscriber station equipment may also comprise other communication devices compatible with the line, such as facsimile devices, modems, computers, etc. For example, station W is shown as having an internal modem PC 133.

Each EO switching system 129 and 131 is also provided with a centralized message service or voice messaging system (VMS) shown in FIG. 12 as 125 and 127. Although referred to as voice messaging systems, the systems 125 and 127 may have the capability of storing messages of a variety of different types as well as voice messages. For example, a single system may receive incoming messages in the form of audible messages such as voice messages, as well as text format data messages. The equipment may also store messages in an image data format such as facsimile.

The voice messaging systems 125 and 127 connect to the switching systems 129 and 131 via simplified message desk interface (SMDI) data lines 135 and 137 and by multi-line hunt groups (MLHG's) 139 and 141. Typically, the MLHG lines consist of a number of T1 type trunk circuits which each carry 24 voice channels in digital time division multiplexed format. Also connected between the switching systems and the voice messaging systems via recent change memory administration channels (RC-MAC) 136 and 138 are multi-services platforms (MSPs) 140 and 142. The MSP is a processor for receiving various service change instructions from other sources, processing the instructions, and forwarding instructions to the switching system. Operation of an RC-MAC channel is described in detail in U.S. Pat. No. 5,012,511 to Hanle et al., the disclosure of which is incorporated herein in its entirety by reference. The voice messaging systems may be of the type illustrated and described in detail in connection with FIG. 9 of above identified parent application Ser. No. 08/179,624.

The LEC 102 is connected to an Internet Gateway Router (IGR) 104 which in turn is connected to the Internet shown at 106. The IGR 104 is connected to an end office switch EO 107 which serves as the exit from and entrance to the LEC cloud 102 for the IGR. The connection between the IGR and end office switch may be a T1 trunk 108. The Internet Gateway Router IGR 104 is connected to the Internet cloud 106 by a T1/T3 trunk 110. The LEC 102 end office EO 107 is also connected to an Internet telephony server 54. The telephony server may be of the type described in above identified parent application Ser. No. 08/670,908.

The second LEC 114 is connected to the other side of the Internet 106 via an Internet Gateway Router IGR 116 and by a telephony server 56. These connections may be made via a T1/T3 trunk 117, T1 trunk 119, and end office EO 121. The LEC 114 serves subscriber telephones indicated by the illustrative telephone stations Y and Z connected by local loops 123 and 124 to end office EO 131. While only a single Internet Gateway Router 116, telephony server 56 and LEC 114 are illustrated in FIG. 12 it will be understood that the LEC 114 is representative of a large number of LECs which connect to the Internet via gateways throughout the United States and world. These gateways and LECs are indicated by the black dots 120. An Internet database 35, such as the type shown in FIG. 10, is connected to the Internet via the link 40. Both LECs 102 and 114 are provided with Common Channel Interoffice Signaling Systems as represented in FIG. 12 by signaling transfer points STPs 42 and 44 connected by data links to the Internet Gateway Routers and end offices.

Figure 13:
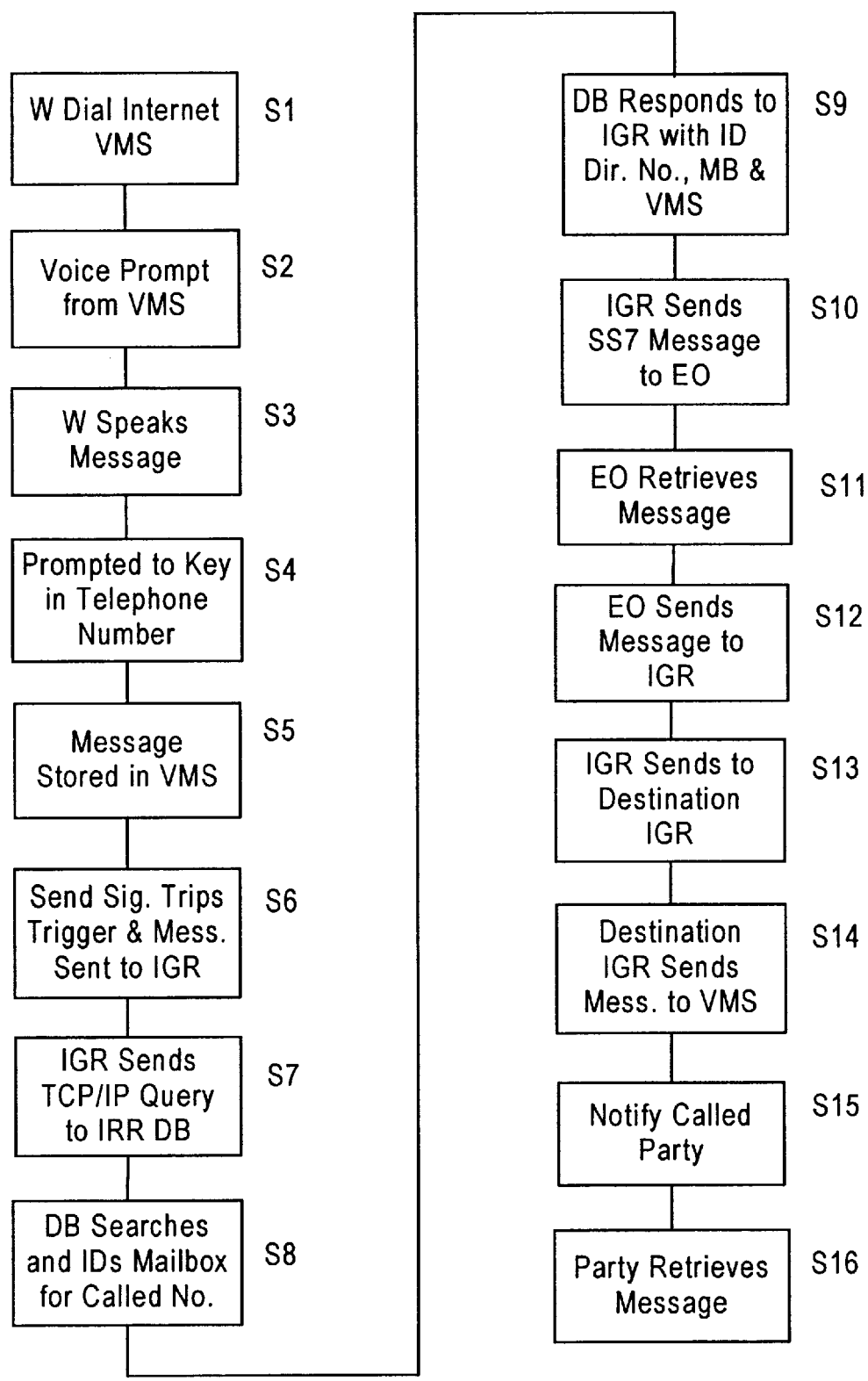
FIG. 13 is a simplified flow chart illustrating one mode of operation of the system illustrated in FIG. 12.

One mode of operation of the system illustrated in FIG. 12 is now described in connection with the simplified flow chart shown in FIG. 13.

A subscriber associated with telephone station W desiring to use the Internet to leave a voice message in the mailbox of a remote subscriber, such as the subscriber associated with telephone station Z, may use the station W to access his own voice mailbox in the voice mail system VMS 125. This may be accomplished by dialing a number associated with the voice mail system VMS 125 for this purpose. The desire to use the mailbox for an Internet communication may be signaled either by use of a unique prefix, such as *84, by way of example, or may be encoded into the number to be dialed to reach the mailbox for Internet communication purposes. At S1 the caller at W dials the prefix to initiate an Internet voice mail connection.

At S2 the voice processing unit of the voice mail system VMS operates its voice menu to direct the caller to speak the message, listen to its playback, and depress a specified key when satisfied with the message, all in a known fashion. It may then query the caller as to whether he desires to send the message immediately (as opposed to later) and, if so, to depress another specified key. This is shown at S3. At S4 the voice unit then will instruct the caller as to the procedure for keying in the telephone number identity of the called or destination station and to depress a further specified key to send the message. At S5 the message is digitized in conventional fashion and stored in the local mailbox of the sender in VMS 125. The caller may go on-hook after depressing the designated send key.

The depression of the designated send key causes the generation of a signal which is recognized by the EO/SSP 510 as a trigger. In response to the trigger, the EO/SSP 129 frames a CCIS inquiry message seeking instructions and this is directed via one or more STP's to the Internet Gateway Router IGR 104 at S6. The CCIS message includes information identifying the calling station and mailbox and VMS, and the called station and the fact that the caller is requesting mailbox-to-mailbox message transfer via the Internet. In FIG. 12 this message is sent via the STP 42 to the Internet Gateway Router IGR 104.

At S7 the Internet Gateway Router IGR 104 reads the CCIS message and formulates and sends a TCP/IP query message to the Internet IRR database 35. The IRR database 35 conducts a search of its data to establish the existence and identity of a mailbox for the called number. This is shown at S8. If the identity of such a mailbox is found the IRR then originates a response to the Internet Gateway Router IGR 104. This is shown at S9. This response contains instructions which include, among other signals, the called directory number and mailbox and VMS identity, along with routing and handling instructions. This message also includes the identity of the originating mailbox and calling directory number. The Internet Gateway Router IGR 104 formulates a CCIS or SS7 message containing this information and sends it via the STP to the originating EO/SSP 129 at S10.

The EO/SSP 129 reads the message and, pursuant thereto, retrieves the stored digitized voice message from the VMS 125 mailbox, packetizes the same in CCIS or SS7 format, including the addressing supplied by the Internet IRR data base at S11. At S12 the EO/SSP 129 transmits this as a message to the Internet Gateway Router IGR 104. At S13 the IGR packages the message in TCP/IP format and transmits the same through the Internet to the gateway designated in the addressing supplied by the IRR, in this instance, the destination Internet Gateway Router IGR 116. At S14 the IGR 116 strips the TCP/IP layer and sends the message in CCIS or SS7 format through the LEC 114 to the EO/SSP 131 and thence to the voice messaging system VMS 127. The voice mail system is so designed as to inherently handle any translation necessary.

When the packets reach the destination EO/SSP 131 and the digitized voice message and accompanying instructions have been deposited in the mailbox of the addressee, the voice mail system VMS 127 effects customary notification of the mailbox proprietor that a message is waiting. This is shown at S15. The mail box proprietor may then access the mailbox in conventional fashion and have the message delivered as an audio voice message in the usual manner at S16. The recipient then has the option of returning a message in a converse fashion by depressing the appropriate keys at his telephone station, which utilizes the information in the packet header to reverse the origination and destination identifications.

As an alternative to the foregoing, instead of delivery of the message in response to action of the addressee, the message may be delivered in response to initiation by the LEC 114 as part of a known message delivery service.

While the voice message has been described as transmitted from the calling telephone station W to the Internet Gateway Router IGR 104 via CCIS or SS7 in the manner described in the common assignee's application Ser. No. 08/371,906, filed Jan. 12, 1995, entitled Voice Mail Communication with Call Blocking, the message could also be transported via voice circuits in the LEC 102.

As another alternative it would be possible to transmit the TCP/IP voice mail message directly to the destination VMS rather than to the local VMS. However, this arrangement is less advantageous from a number of standpoints. The described mail box to mail box technique permits non-real time transfer during times of low traffic and congestion. The deposit of the voice message in the local mail box in the local VMS provides a minimum link path and minimizes the delays inherent in packet communication. As a result the quality of the message is improved as compared to a message transmitted by packet over a longer path.

According to another embodiment, the invention provides a system and method for transferring voice mail or messages to called parties who are not voice mail subscribers and thus do not possess individual or personal mailboxes. Pursuant to this embodiment of the invention, Voice Messaging Systems VMS 125 and 127 in the simplified network illustrated in FIG. 12 are provided with multiple unsubscribed mailboxes, which are here described as public mailboxes or mailboxes for temporary hire. It will be understood that such mailboxes may constitute mere addresses or addressable storage or memory in the voice messaging system storage. Such mailboxes may be utilized according to a first embodiment of this facet of the invention in the following fashion.

Figure 14:
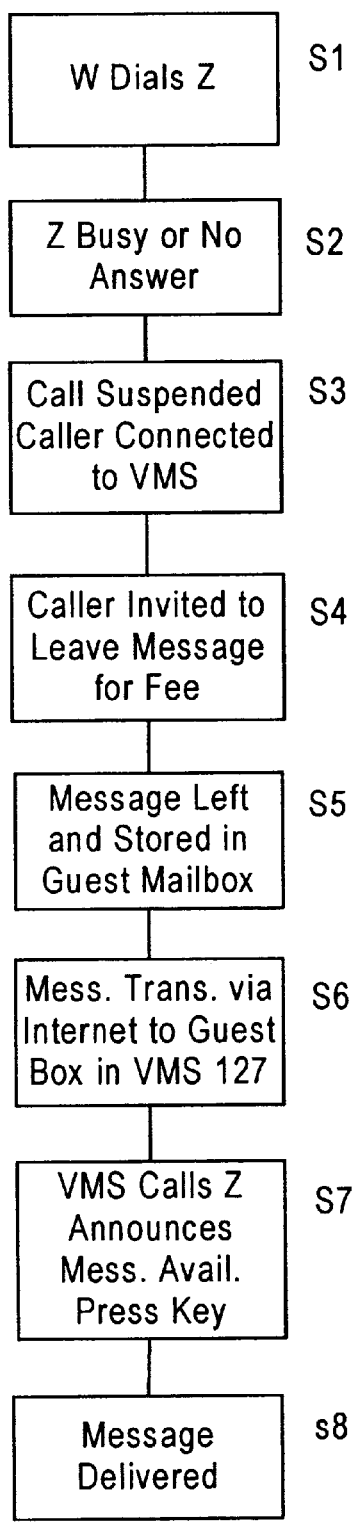
FIG. 14 is a simplified flow chart illustrating another mode of operation of the system illustrated in FIG. 12.

Referring to the simplified flow chart in FIG. 14. a caller at telephone station W connected to end office EO 129 makes a call to a remote called party at station Z at end office EO 131. This is shown at S1. In this case the common channel signaling system determines that the call cannot be completed because of a busy or a no answer situation as shown at S2. At S3 the attempt to establish a voice connection between the two telephone stations is terminated and the caller is connected to the voice messaging system VMS 125 associated with the originating end office EO 129. The voice processing unit associated with the voice messaging system VMS 125 informs the caller that the line is busy or that there is no answer. The prompt also inquires as to whether or not the caller would like to leave a message and have it delivered. It also indicates that if the caller chooses to leave a message for delivery the charge will be, for example, seventy-five cents. The Voice Processing Unit requests a yes or no response, either by voice or DTMF key or the equivalent. This is shown at S4. Where the response is affirmative, the caller is invited to leave the message in the conventional voice mail fashion and the message is stored in a public mailbox in the voice mail system VMS 125 at S5. Appropriate messaging then occurs via the SMDI link 135 to effect billing to the caller.

Subsequent to storage of the message as digital data, the message is transferred via the Internet from the public mailbox in voice messaging system VMS 125 to a temporarily mating or corresponding public mailbox in voice messaging system VMS 127. This is shown at S6. Such transfer is effected through the Internet in the manner previously described. Following deposit or storage of the message in the destination voice messaging system VMS 127, that voice mail system initiates attempts to reach the called party or addressee at telephone station Z to announce to that party that a message has been deposited. This is shown at S7. The same announcement may include the instruction that the message may be heard by depression of a stated DTMF key. The actuation of the key may initiate the creation of a record constituting a receipt for the originating party. The digitally stored voice message is then delivered from the voice messaging system VMS 127 to the caller at station Z as an audio voice message in the conventional fashion. This is shown at S8.

In the preceding examples of voice mail usage the voice messaging systems have been connected to the telephone networks in a conventional fashion. It is also a feature of the invention that voice messaging systems (VMSs) dispersed over a wide geographic area may be connected directly to the Internet through router gateways or interfaces incorporated into the voice messaging systems as an integral part thereof. Two such voice mail systems are shown at VMS 50 and VMS 52 in FIG. 12. Alternatively the voice mail systems may be connected to the Internet through separate gateway routers such as the Internet Gateway Routers (IGRs) 104 and 116.

With this architecture using geographically dispersed voice messaging systems connected to the Internet, the invention comprehends the provision of still additional custom calling services to subscribers.

Figure 15:
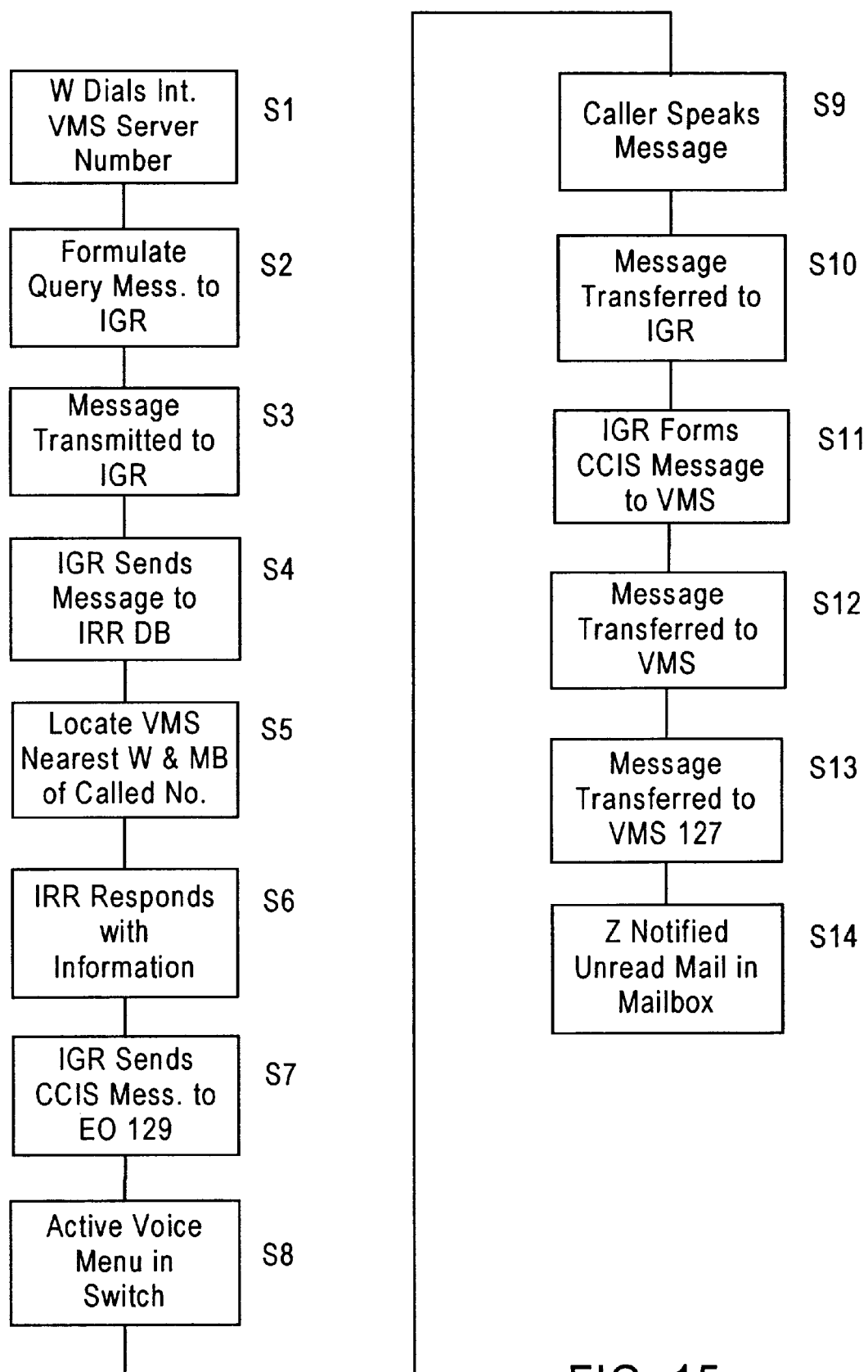
FIG. 15 is a simplified flow chart illustrating another mode of operation of the system illustrated in FIG. 12.

Thus according to another embodiment of the invention the network illustrated in FIG. 12 may be utilized to provide the voice mail services previously described in relation to FIG. 12 without the necessity for providing or maintaining the Telco connected voice messaging systems VMS 125 and 127 and their related connections. Operation of one such embodiment may be described as follows in relation to the simplified flow diagram in FIG. 15.

A subscriber associated with telephone station W having no voice mail service may desire to use the Internet implemented service to leave a voice message in the mailbox of a remote subscriber, such as the subscriber associated with telephone station Z. This may be accomplished by the caller at W dialing a number associated with an Internet voice messaging service provided by the LEC 102 for this purpose. The desire to use the service may be signaled either by use of a unique prefix, such as *85, by way of example, or may be encoded into a number to be dialed to access such Internet communication services. This dialing is shown at S1. Each end office EO/SSP in the LEC 102 has its switch programmed to have an originating trigger responsive to such dialing. Upon dialing the designated prefix or number the trigger is tripped or activated. In response to the trigger, the end office EO/SSP frames a CCIS inquiry message which is directed to the Internet Gateway Router IGR 104 via one or more STP's. This is shown at S2. The CCIS message includes information identifying the calling station and the called station and the fact that the caller is requesting mailbox-to-mailbox message transfer via the Internet using at least one Internet voice mail system.

At S3 this message is sent via the STP 42 to the Internet Gateway Router IGR 104. The IGR 104 reads the CCIS message and formulates and sends a TCP/IP query message to the Internet IRR database 35 at S4. The Internet IRR data base 35 consults its data to establish the identity of the Internet connected voice messaging system VMS nearest to the end office EO to which the caller is connected. The Internet data base IRR 35 also seeks to establish the existence and identity of a mailbox for the called number. This is shown at S5. If the identity of such a mailbox is found the IRR the IRR originates a response to the IGR 104. This response includes instructions which include, among other signals, the called directory number and the identity of a mailbox and voice messaging system for the called number along with routing and handling instructions. The response also includes the identity of the Internet voice messaging system VMS 50 which is nearest to the calling end office EO 129 and an address for an available public mailbox therein, and the calling directory number. This is shown at S6.

The Internet Gateway Router IGR 104 formulates a CCIS or SS7 message containing this information and sends it via the STP to the originating EO/SSP 129 at S7. The EO/SSP 129 reads the CCIS or SS7 message and responsive thereto activates a voice menu in the switch 129 at S8. This may direct the caller to speak the message and then direct the caller to depress a specified key when satisfied with the message in a known fashion. The caller speaks the message and depresses the designated key at S9.

At S10 the caller's message is digitized in the EO switch 129 in conventional fashion and transmitted to the Internet Gateway Router IGR 104 with the addressing supplied by the Internet data base IRR 35 in its response message. The message may be in T-1 or SS7 format, i.e., it may proceed through the LEC 102 via either the CCIS network or the voice network as previously described. At Sl the Internet Gateway Router IGR 104 places the message in TCP/IP format with appropriate addressing for the Internet voice messaging system VMS identified by the Internet data base IRR 35 in its response to the initial inquiry. In the network illustrated in FIG. 12 this may be the VMS 50. At S12 the message is transmitted to the voice messaging system VMS 50 and stored therein in a format determined by the manufacturer of the equipment. As previously pointed out, such manufacturers provide such VMS systems with a capability to perform the necessary translations between the signals arriving at the VMS and the internal protocol. The converse is true with respect to signals being transmitted from the VMS.

At S13 the message stored in the VMS 50 is transferred through the Internet at a convenient time to the destination VMS mailbox identified by the Internet data base IRR 35. In this example that may be the Telco connected voice messaging system VMS 127. At S14 the addressed party is notified that unread voice mail exists in his mailbox in a manner previously explained.

In the foregoing example it was assumed that the called party was possessed of or subscribed to a mailbox. It is a feature of the invention that the Internet mailbox to mailbox service may be provided if neither the called nor the called party subscribes to a mailbox. In such a situation the Internet data base IRR 35 in its data search would retrieve not only the address for the Internet connected VMS 50 but also the identity of the Internet connected VMS in closest proximity to the end office EO of the called party. In the illustration in FIG. 12 this may be the voice messaging system VMS 52. In this example the mailbox to mailbox transfer of the digitized voice mail message would deposit the message in the VMS 52 rather than the VMS 127 which was used in the prior example. Delivery may then be effected as described. Such delivery would be through the Internet Gateway Router IGR 116 with protocol translation in the manner previously described.

In the foregoing embodiments of the use of voice mail the user has elected to deposit a voice message in the voice mail box of a called party. In such a situation special handling is initiated by an originating trigger in the EO switching system used by the calling party. It is also a feature of the invention that mail box or VMS communication can be used in busy, ring-no answer service situations. Such busy, no-answer services normally entail call forwarding and the set up of a voice circuit to the called end office. This constitutes and is billed as a completed call. If the geographic separation of the telephone stations is such as to incur a long distance toll this is charged to the party having the answering or voice mail service. The present invention provides one or more alternatives that avoid such charges and yet permit a two way transfer of communication in a manner which offers multiple options to the called party who subscribes to the new call answering service.

According to one embodiment of the invention the Telco subscriber desiring a Telco provided answering service subscribes to a new service wherein a call forwarding type terminating trigger is set in the end office EO which is the EO for the number of the subscriber to the service. This same subscriber may also subscribe to a "Return Call" service provided according to the instant invention. Conventional Return Call service allows the called party to actuate automatic dialing of the calling number upon the dialing an advertised code such as, for example, *69. In dialing this advertised Return Call prefix the subscriber is agreeing to a stated charge, for example, seventy five cents. Ordinarily this service is advertised by a voice prompt delivered to the party who receives voice mail notification of a missed call. However, in the case of a Telco subscriber who has enabled call forwarding, the actual terminating end office from which the return call would originate could be a substantial distance from the end office EO represented by the number which was dialed by the caller, i.e., the site from which the number was forwarded. If conventional return call service is accepted from this distant office a substantial long distance toll might be incurred. However, by using the embodiment of the invention presently to be described this cost could be very considerably reduced.

An example of one manner in which such a saving may be realized may operate in the following manner described in relation to the simplified flow chart of FIG. 16. Referring to FIG. 12, the subscriber to telephone station X connected to end office EO 129 in LEC 102, subscribes to call forwarding, Telco provided call answering, as well as the new embodiment of Return Call services. In this example the subscriber from telephone station X has travelled to a distant site and directed that his calls be forwarded to the number of the telephone station Z connected to end office EO 131 in LEC 114. Any telephone call from station Z to a telephone station in the vicinity of the forwarding station X would incur a charge for a long distance call. This information is included in data that is accessible to the Internet IRR database 35 according to this embodiment of the invention. It is to be recalled that, as previously explained, this is a hierarchical distributed database.

If a caller at telephone station W dials the number of telephone station X, which is ordinarily a local call, the call is forwarded to station Z. It is assumed for this example that the call is handled through the involved telephone networks. In this case subscriber X, whose calls are forwarded to station Z, has subscribed to Internet implemented network answering services according to this embodiment of the invention.

Figure 16:
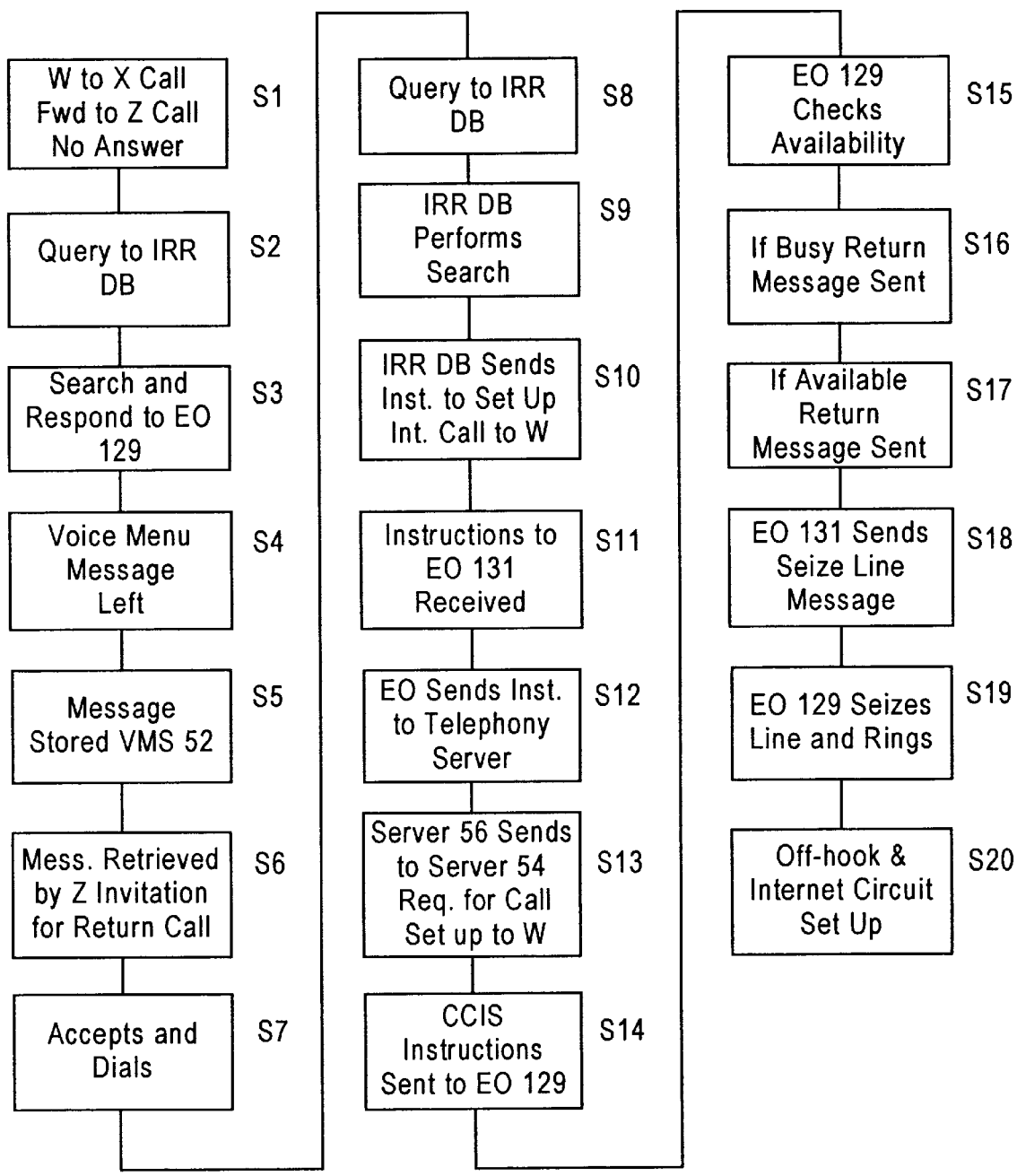
FIG. 16 is a simplified flow chart illustrating another mode of operation of the system illustrated in FIG. 12.

At S1 in FIG. 16 a call from telephone station W is forwarded to station Z through the telephone networks and encounters a busy or a ring-no answer situation. The call forwarding terminating trigger for the subscribing station X exists at the end office EO 129 to which station X is connected. The dialing of the number for X trips this trigger. This results in an inquiry to the Internet data base IRR 35 at S2. This inquiry is transmitted to the Internet data base IRR 35 through the Internet Gateway Router IGR 104, using the previously described CCIS-TCP/IP methodology. The Internet data base IRR 35 performs a search at S3, and accesses the customer profile and Internet routing record for subscriber X.

This indicates, among other information, that X is a subscriber to call forwarding, call answering, Return Call, and to the new Internet answering service wherein no long distance telephone toll is to be incurred in the performance of these services. The data search also reveals that a call forwarding order exists, that calls are currently to be forwarded to station Z, that Internet voice messaging station VMS 52 is nearest to the forwarding number for station Z, that Internet voice messaging system VMS 50 is nearest the forwarding station X, and that telephone calls from station X to station Z involve a telephone long distance toll. The Internet data base 35 returns a response to the triggered and inquiring end office EO 129 at S3. This response is transmitted via the Internet Gateway Router 104 using the TCP/IP-CCIS methodology previously described. Pursuant to the instructions in the response the caller receives the voice menu answering service prompt advising that the party is unavailable and inviting the leaving of a message, and a brief message is left. This is shown at S4.

In accordance with this embodiment of the invention this message is stored in Internet connected voice messaging system VMS 52, which is the closest to the subscribing party who is now at telephone station Z. This is shown at S5. There is no connection established through the telephone networks and thus no long distance charge incurred. The called subscriber to the Internet voice mail and call answering service has merely used his subscribed Internet service which usually entails a flat monthly charge. The call processing resulting in the deposit of the message in VMS 52 occurs in the manner previously described in connection with the operation of the mail box embodiments.

At S6 subscriber X, using the forwarding station Z, retrieves from Internet voice messaging system 52 the voice mail message from the party who called from station W. That message comprises a request to call the number which was recorded by the caller from station W. In this example, subscriber X has no knowledge as to the identity of the caller, or does not recognize the name which was left. Since subscriber X has a subscription to return call service he receives with the retrieval of the number an invitation to use the return call service.

At S7 subscriber X accepts the return call invitation by dialing the pre-established prefix *69. This results in an inquiry to the Internet data base IRR 35 from the end office switch EO 131 at which the dialing occurred. This is shown at S8. This inquiry is transmitted to through Internet Gateway Router IGR 116 using the CCIS-TCP/IP methodology previously discussed. At S9 the Internet data base IRR 35 performs a search. The search results confirm the subscriptions of subscriber X, including the determination that a call between stations W and Z through the telephone networks would entail a telephone long distance toll charge. As a result of the service offered to subscriber X pursuant to this embodiment of the invention, the Internet data base returns to IGR 116 a TCP/IP response that directs the set up of an Internet telephone call from station Z to station W. This is shown at S10.

These directions include all necessary addressing. Such addressing will include the addresses of the telephony servers which the Internet data base determines to be nearest to the origination and destination end offices, in this case EO 131 and EO 129. This response is returned to the Internet Gateway Router IGR 116. IGR 116 in turn sends a CCIS or SS7 message to EO 131 containing the necessary call set up instructions received from Internet data base 35. Message received at EO 129 as shown at S11.

In response to receipt of this message end office EO 131 formulates and sends to telephony server 56 the Internet call set up instructions at S12. At S13 telephony server 56 sends to telephony server 54 a TCP/IP request for the Internet telephony call set up to station W. At S14 telephony server 54 sends the request in CCIS or SS7 format to the destination end office EO 129 for station W. Destination office EO 129 checks the availability of the local link to telephone station W at S15. If the link is found to be busy the destination EO 129 returns to telephony server 54 a CCIS or SS7 message to that affect. This message is returned through the Internet and LEC 114 to the originating end office EO 131 in the inverse fashion in which the request was sent to EO 129. This is shown at S16. The end office EO 131 sends a busy signal to station Z and may include an inquiry as to whether or not the caller would like a recall made in a specified period such as thirty minutes.

If the destination end office EO 129 finds the link to station W is available it blocks calls to that line and notifies the originating end office EO 131 of its availability through the same signaling path and formats as just described. This is shown at S17. On receiving such notice of availability end office EO 131 sends a seize line message back to destination end office EO 129 through the same signaling path and formats. This is shown at S18. On receiving that message the destination end office 129 seizes the line and sends a ringing signal to station W at S19. Assuming that the telephone at station W goes off-hook, a virtual circuit is set up through the Internet for telephony communication in the manner which is understood by those skilled in the art. This is shown at S20.

The quality of Internet telephony currently available through POTS terminals and twisted pair local links is not on a par with the service available through conventional Telco circuits, as will be understood by those skilled in the art. As a result, the subscriber at station Z has the option to conclude the Internet voice connection and to recall the party at station W via the Telco circuits, if the higher available quality is desired. On the other hand the party at station W may only be making a sales solicitation. In such a circumstance the subscriber at station Z has ascertained this without incurring the cost of a long distance telephone toll charge.

It will readily be seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. A communications system comprising in combination:
   a) first and second switched telecommunications networks having trunked together switching systems connected by local links to subscriber stations and having a switching control data network for effecting selective connection of said subscriber stations through said switching systems;
   b) said first and second switched telecommunications networks each having a central voice messaging system, said messaging systems each having storage for digitized voice messages;
   c) a routing database connected to the Internet and having stored therein routing information for effecting selective connection of calls placed to called subscriber stations pursuant to preselected options of said called subscriber stations;
   d) at least one of said switching systems having control parameters set therein, wherein the initiation of a signal for connection between a caller at one of said subscriber stations to one of said called subscriber stations causes data signaling between at least one of said switched telecommunications networks and said routing database through the Internet, resulting in retrieval of routing instructions corresponding to a stored preselected option from said routing database and in connection between said caller and one of said central voice messaging systems pursuant to said routing instructions, whereby said caller stores a message in said one central voice messaging system for subsequent delivery to said called subscriber station.

2. A communications system according to claim 1, wherein said central voice messaging systems are connectable to said first or second switched telecommunications networks through the Internet.

3. A communications system according to claim 1, wherein said message is delivered to said called subscriber station from a second of said central messaging systems other than said one central messaging system.

4. A communications system according to claim 3, wherein said message is transferred from said one central messaging system to said second central messaging system.

5. A communications system according to claim 4, wherein said message is transferred from said one central messaging system to said second central messaging system through the Internet.

6. A communications system according to claim 1, wherein the Internet is respectively connected to said first and second switched telecommunications networks through first and second interfaces.

7. A communications system comprising in combination:
   a) first and second switched telecommunications networks having trunked together switching systems connected by local links to subscriber stations and having a switching control data network for effecting selective connection of said subscriber stations through said switching systems;
   b) a routing database connected to the Internet and having stored therein routing information for effecting selective connection of calls placed to called subscriber stations pursuant to preselected options of said called subscriber stations;
   c) first and second voice messaging systems connected to the Internet at different geographical locations, said voice messaging systems each having storage for digitized voice messages;
   d) at least one of said switching systems having control parameters set therein, wherein the initiation of a signal for connection between a caller at one of said subscriber stations to one of said called subscriber stations causes data signaling between at least one of said switched telecommunications networks and said routing database through the Internet, resulting in retrieval of routing instructions corresponding to a stored preselected option from said routing database and in connection between said caller and one of said voice messaging systems pursuant to said routing instructions, whereby said caller stores a message in said one voice messaging system for subsequent delivery to said called subscriber station.

8. A communications system according to claim 7 wherein said message is delivered to said called subscriber station from a second of said messaging systems other than the one messaging system.

9. A communications system according to claim 8, wherein said message is transferred from said one messaging system to said second messaging system through the Internet.

10. A communications system according to claim 7 wherein the Internet is respectively connected to said first and second switched telecommunications networks through first and second interfaces.

11. A communications system according to claim 10 wherein said interfaces include routers.

12. A method of voice communication through a first switched telecommunications network having trunked together switching systems connected to subscriber stations by local links, and a link through the Internet, comprising the steps of:
   a) storing in a database connected to the Internet routing data for processing calls between said subscriber stations and for distinguishing between subscriber calls which entail a distance or time toll charge and calls which do not entail such a charge;
   b) initiating a call from a caller at a first of said subscriber stations to a second of said subscriber stations;
   c) suspending said call prior to establishing a voice connection through said first switched telecommunications network and determining via the Internet from said database whether a distance or time toll charge would be entailed in the completion of said call;
   d) establishing a voice connection and completing said call through said switched telecommunications network in the event that it is determined in step c) that a distance or time toll charge would not be entailed; and
   e) completing said call through an Internet link to avoid a distance charge in the event that it is determined in step c) that a distance or time toll charge would be entailed.

13. A method according to claim 12, wherein step e) comprises:

connecting said call to a voice messaging system connected to the Internet, and providing said caller an option to store a message for a party at said second subscriber station.

14. A method of voice communication through a communication path comprising (i) a first switched telecommunications network having trunked together switching systems connected to subscriber stations by local links, (ii) an Internet link, and (iii) a second switched telecommunications network having trunked together switching systems connected to subscriber stations by local links, the method comprising the steps of:

a) linking to the Internet a plurality of voice messaging systems at geographically spaced sites;

b) storing in a database storage connected to the Internet data for processing calls between said subscriber stations connected to said switching systems in said first and second switched telecommunications networks, said database storage including information relating to the geographic locations of said voice messaging systems;

c) upon failure to obtain a completed connection between a calling subscriber station and a called subscriber station, determining from said stored information the identity of (i) the voice messaging system in said plurality of voice messaging systems which is nearest to said calling subscriber station, and (ii) the voice messaging system in said plurality of voice messaging systems which is nearest to said called subscriber station;

e) storing in said voice messaging system nearest to said calling station a message from said calling subscriber station;

f) transmitting said message through the Internet from said voice messaging system nearest to said calling subscriber station to said voice messaging system nearest to said called subscriber station and storing said message therein; and g) transmitting said message from said voice messaging system nearest to said called subscriber station to said called subscriber station.

15. A method according to claim 14 wherein said message is transmitted from said voice messaging system nearest to said called subscriber station to said called subscriber station in response to a signal from said called subscriber station.

16. A method according to claim 14, wherein said message is transmitted from said voice messaging system nearest to said called subscriber station to said called station by ringing said called subscriber station.

17. A method according to claim 14, wherein said transmitting step further comprises inquiring if a party at the called station desires automatic dialing of said calling station.

18. A method according to claim 17, wherein said database storage comprises routing data for processing calls between said subscriber stations and for distinguishing between subscriber calls which entail a distance or time toll charge and calls which do not entail such a charge and further comprising, in response to a positive response to said inquiry, the steps of:

determining whether a call from said called subscriber station to said calling subscriber station would entail a distance or time toll charge;

establishing a voice connection and completing said call through said switched telecommunications networks in the event that it is determined that a distance or time toll charge would not be entailed.

19. A method of voice communication through (i) a first switched telecommunications network having trunked together switching systems connected to subscriber stations by local links, (ii) an Internet link, and (iii) a second switched telecommunications network having trunked together switching systems connected to subscriber stations by local links, said Internet link providing communication access between each of said telecommunications networks and a voice messaging system remote from said telecommunications networks, said method comprising the steps of:

storing in a database storage connected to the Internet data for processing calls between said subscriber stations connected to said switching systems in said first and second switched telecommunications networks;

in response to dialing at a calling station in said first switched telecommunications network a telephone number for a call to a station in said second switched telecommunications network, determining if the call can be completed;

upon failure to obtain a connection between the calling and called stations in said determining step, identifying from information stored in said database storage the address said voice messaging system;

storing in said voice messaging system a message from said calling station; and transmitting said message from said voice messaging system to said called station.

20. A method according to claim 19, wherein said transmitting step further comprises inquiring if a party at the called station desires automatic dialing of said calling station.

21. A method according to claim 20, wherein said database storage contains data for distinguishing between subscriber calls which entail a distance or time toll charge and calls which do not entail such a charge, and, in response to a positive answer in said inquiring step, further comprising the steps of:

determining whether a return call from said called station to said calling station would entail a distance or time toll charge;

establishing a voice connection and completing said call through said switched telecommunications networks in the event that it is determined that a distance or time toll charge would not be entailed; and completing said call through a combination of said switched telecommunications networks and the Internet in the event that a distance or time toll charge would be entailed.

22. A method according to claim 19, wherein said message is transmitted from said voice messaging system to said called station in response to a signal from said called station.

* * * * *